(12) United States Patent
Roeland et al.

(10) Patent No.: US 11,178,602 B2
(45) Date of Patent: Nov. 16, 2021

(54) NETWORK PARTITIONS

(71) Applicant: Telefonaktiebolaget LM Ericsson (publ), Stockholm (SE)

(72) Inventors: Dinand Roeland, Sollentuna (SE); Heidi-Maria Back, Helsinki (FI); Tomas Mecklin, Kyrkslätt (FI); György Miklós, Pilisborosjenő (HU); Miljenko Opsenica, Espoo (FI); Göran Rune, Linköping (SE); Mohit Sethi, Helsinki (FI); Le Wang, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 500 days.

(21) Appl. No.: 16/318,043

(22) PCT Filed: Jul. 15, 2016

(86) PCT No.: PCT/EP2016/066903
§ 371 (c)(1),
(2) Date: Jan. 15, 2019

(87) PCT Pub. No.: WO2018/010811
PCT Pub. Date: Jan. 18, 2018

(65) Prior Publication Data
US 2021/0289432 A1 Sep. 16, 2021

(51) Int. Cl.
*H04W 12/06* (2021.01)
*H04W 48/18* (2009.01)
*H04W 28/08* (2009.01)

(52) U.S. Cl.
CPC .......... *H04W 48/18* (2013.01); *H04W 12/06* (2013.01); *H04W 28/08* (2013.01)

(58) Field of Classification Search
CPC ...... H04W 48/18; H04W 12/06; H04W 28/08
See application file for complete search history.

(56) References Cited

U.S. PATENT DOCUMENTS

2014/0373124 A1* 12/2014 Rubin ................. H04L 63/0861
726/7
2018/0278607 A1* 9/2018 Loladia ............... H04L 61/1588

FOREIGN PATENT DOCUMENTS

KR   10-2013-0047489 A   5/2013
WO        02/32178 A1    4/2002

OTHER PUBLICATIONS

International Search Report and Written Opinion dated Apr. 10, 2017 for International Application No. PCT/EP2016/066903 filed on Jul. 15, 2016, consisting of 10-pages.
(Continued)

*Primary Examiner* — Ted M Wang
(74) *Attorney, Agent, or Firm* — Christopher & Weisberg, P.A.

(57) ABSTRACT

In response to a transition from a previous operational state to a current operational state of a given network partition of a plurality of network partitions of a core of a cellular network, a respective entry of a registry of the plurality of network partitions is updated. Network partition selection for a terminal is effected by participating in a communication of at least one selection control message corresponding to at least one entry of the registry.

18 Claims, 18 Drawing Sheets

(56) References Cited

OTHER PUBLICATIONS

3GPP TR 23.707 V13.0.0; 3rd Generation Partnership Project; Technical Specification Group Services and System Aspects; Architecture Enhancements for Dedicated Core Networks; Stage 2 (Release 13); Dec. 2014, consisting of 39-pages.
Ericsson White Paper—Uen 284 23-3248; Network Functions Virtualization and Software Management; Dec. 2014, consisting of 9-pages.
Pusateri, T.; Internet Engineering Task Force; Apple Inc. "DNS Push Notifications"; Mar. 9, 2015, consisting of 17-pages.
Ericsson Internal Technical Report; Goran Hall ERVGH; CN2020 Architecture Specification; Jun. 30, 2015; consisting of 83-pages.
MQTT v3.1.1 now an OASIS Standard; MQTT.org; Nov. 7, 2014, consisting of 2-pages.
SA WG2 Meeting #116 S2-163982; Title: Update of Network Slicing Solution 1.3; Source: NTT DoCoMo, LG Electronics Inc., ITRI; Document for: Approval; Agenda Item: 6.10.1, Location and Date: Vienna, Austria, Jul. 11-15, 2016, consisting of 8-pages.
RAN WG3 Meeting #92 R3-161133; Title: Key Principles for Support of Network Slicing in RAN; Source: Huawei; Agenda item: 10.2.3; Document for: Approval; Location and Date: Nanjing, China May 23-27, 2016, consisting of 6-pages.
SA WG2 Meeting #116 S2-163979; Title: Network slicing selection solution based on Slice Instance ID; Source: China Mobile, CATT, CATR; Document for: Approval; Agenda Item: 6.10.1, Location and Date: Vienna, Austria, Jul. 11-15, 2016, consisting of 4-pages.
Ericsson Technology Review; A Vision of the 5G Core: Flexibility for New Business Opportunities; Charting the Future of Innovation, vol. 93 #2, 2016, consisting of 16-pages.
Alcatel-Lucent; Strategic White Paper; The LTE Network Architecture, A comprehensive tutorial, 2009, consisting of 26-pages.

* cited by examiner

| partition | MME address | state |
|---|---|---|
| 191→ 171 | mmec.mmegi.partitionid.plmnid.provider.com | 181 |
| 192→ 172 | mmec.mmegi.partitionid.plmnid.provider.com | 182 | ns
NETWORK PARTITIONS

CROSS-REFERENCE TO RELATED APPLICATIONS

This application is a Submission Under 35 U.S.C. § 371 for U.S. National Stage Patent Application of International Application Number: PCT/EP2016/066903, filed Jul. 15, 2016 entitled "NETWORK PARTITIONS," the entirety of which is incorporated herein by reference.

TECHNICAL FIELD

Various techniques relate to updating an entry of a registry of a plurality of network partitions in response to the transition from a previous operational state to a current operational state of a given network partition. Various techniques relate to network partition selection

BACKGROUND

There is a trend to virtualize previously hardware-based cellular networks. A virtualized network comprising virtualized and non-virtualized resources can be shared among different operators.

As the cellular networks are being virtualized, there is a vision that the future core networks can be split in a similar fashion as the cloud-based web services which are already deployed today. Several cellular network operators—then better referred to as cellular virtual network operators—could share the same hardware infrastructure and run their network partitions using one and the same hardware infrastructure. Future core networks should accelerate service innovation and favor various business models.

A network partition—sometimes also referred to as network slice—is a logical instantiation of a network. Here, it may be possible to deliver and deploy complex Virtualized Network Functions (VNFs). Such delivery and deployment of VNFs may be implemented as a pre-integrated system. Sometimes, a network partition is also referred to as a network slice.

A current implementation is the Third Generation Partnership Project (3GPP)-specified Dedicated Core (DECOR), see 3GPP Technical Specification (TS), v. 13.0.0 (2014). DECOR allows an operator to deploy multiple Dedicated Core Networks (DCNs) within a single public land mobile network (PLMN). The DCNs comprise of one or multiple core network entities.

In current cellular networks, the configuration and deployment is comparably static and does not change often. For example, in one implementation of the base station (BS), the BS may poll for a authorization entity such as the Mobility Management Entity (MME) periodically with low periodicity, e.g., a number of hours. In some other reference implementations, manual configuration of the available MMEs is used in the BS. Such techniques face certain restrictions and drawbacks. E.g., there may be a limited flexibility associated with low-periodicity updating or manual configuration. Then it may be difficult to maintain up-to-date if there are frequent changes.

On the other hand, if the vision of flexible network partitions becomes reality, it is to be expected that network partitions are sometimes short-lived and created on-need basis. This means new MMEs or corresponding nodes will appear to the network much more ad-hoc than in the cellular networks today. To achieve fast deployment times for partitions, e.g., down to minutes compared to months that may be used for new services today, even an interval for checking for updated list of MMEs based on hours may not enough to meet the fast deployment times. Increasing the polling interval is usually not a good alternative either, because it typically creates extra traffic. E.g., 3GPP DECOR does not provide the possibility of dynamic adjustments to the DCN settings.

SUMMARY

Therefore, a need exists for advanced techniques of network partition selection. In particular, a need exists for techniques which overcome or mitigate at least some of the above-identified restrictions and drawbacks.

This need is met by the features of the independent claims. The dependent claims define embodiments.

According to an example, a method comprises, in response to the transition from a previous operational state to a current operational state of a given network partition of a plurality of network partitions of a core of a cellular network: updating a respective entry of a registry of the plurality of network partitions. The method further comprises effecting a network partition selection for a terminal by participating in the communication of at least one selection control message corresponding to at least one entry of the registry. Each entry of the registry associates a respective network partition of the plurality of network partitions with at least one authorization entity. The at least one authorization entity is for granting access to the respective network partition. Each entry of the registry further associates a respective network partition of the plurality of network partitions with the service capability of the current operational state of the respective network partition.

A computer program product, according to an example, comprises instructions which, when carried out by at least one processor, cause the at least one processor to perform a method. The method comprises: in response to the transition from a previous operational state to a current operational state of a given network partition of a plurality of network partitions of a core of a cellular network: updating a respective entry of a registry of the plurality of network partitions. The method further comprises effecting a network partition selection for a terminal by participating in the communication of at least one selection control message corresponding to at least one entry of the registry. Each entry of the registry associates a respective network partition of the plurality of network partitions with at least one authorization entity. The at least one authorization entity is for granting access to the respective network partition. Each entry of the registry further associates a respective network partition of the plurality of network partitions with the service capability of the current operational state of the respective network partition.

A computer program, according to an example, comprises instructions which, when carried out by at least one processor, cause the at least one processor to perform a method. The method comprises: in response to the transition from a previous operational state to a current operational state of a given network partition of a plurality of network partitions of a core of a cellular network: updating a respective entry of a registry of the plurality of network partitions. The method further comprises effecting a network partition selection for a terminal by participating in the communication of at least one selection control message corresponding to at least one entry of the registry. Each entry of the registry associates a respective network partition of the plurality of network partitions with at least one authorization entity. The at least one authorization entity is for granting access to the respective network partition. Each entry of the registry further associates a respective network partition of the plurality of network partitions with the service capability of the current operational state of the respective network partition.

According to an example, an entity comprises a module for, in response to the transition from a previous operational state to a current operational state of a given network partition of a plurality of network partitions of a core of a cellular network, updating a respective entry of a registry of the plurality of network partitions. The entity further comprises a module for effecting a network partition selection for a terminal by participating in the communication of at least one selection control message corresponding to at least one entry of the registry. Each entry of the registry associates a respective network partition of the plurality of network partitions with at least one authorization entity. The at least one authorization entity is for granting access to the respective network partition. Each entry of the registry further associates a respective network partition of the plurality of network partitions with the service capability of the current operational state of the respective network partition.

According to an example, a method comprises, in response to the transition from a previous operational state to a current operational state of a given network partition of a plurality of network partitions of a core of the cellular network: updating a respective entry of a registry of the plurality of network partitions. The method further comprises effecting a network partition selection for a terminal by participating in a push communication of at least one selection control message corresponding to at least one entry of the registry. Each entry of the registry associates a respective network partition of the plurality of network partitions with at least one authorization entity. The at least one authorization entity is for granting access to the respective network partition.

A computer program product, according to an example, comprises instructions which, when carried out by at least one processor, cause the at least one processor to perform a method. The method comprises: in response to the transition from a previous operational state to a current operational state of a given network partition of a plurality of network partitions of a core of the cellular network: updating a respective entry of a registry of the plurality of network partitions. The method further comprises effecting a network partition selection for a terminal by participating in a push communication of at least one selection control message corresponding to at least one entry of the registry. Each entry of the registry associates a respective network partition of the plurality of network partitions with at least one authorization entity. The at least one authorization entity is for granting access to the respective network partition.

A computer program, according to an example, comprises instructions which, when carried out by at least one processor, cause the at least one processor to perform a method. The method comprises: in response to the transition from a previous operational state to a current operational state of a given network partition of a plurality of network partitions of a core of the cellular network: updating a respective entry of a registry of the plurality of network partitions. The method further comprises effecting a network partition selection for a terminal by participating in a push communication of at least one selection control message corresponding to at least one entry of the registry. Each entry of the registry associates a respective network partition of the plurality of network partitions with at least one authorization entity. The at least one authorization entity is for granting access to the respective network partition.

According to an example, an entity comprises a module for, in response to the transition from a previous operational state to a current operational state of a given network partition of a plurality of network partitions of a core of the cellular network, updating a respective entry of a registry of the plurality of network partitions. The entity further comprises a module for effecting a network partition selection for a terminal by participating in a push communication of at least one selection control message corresponding to at least one entry of the registry. Each entry of the registry associates a respective network partition of the plurality of network partitions with at least one authorization entity. The at least one authorization entity is for granting access to the respective network partition.

According to an example, a device comprises a memory configured to store control instructions. The device further comprises at least one processor. The at least one processor is coupled with a memory. The at least one processor is configured to execute the control instructions. Execution of the control instructions causes the at least one processor to perform: in response to the transition from a previous operational state to a current operational state of a given network partition of a plurality of network partitions of a core of a cellular network: updating a respective entry of a registry of the plurality of network partitions; effecting a network partition selection for a terminal by participating in the communication of at least one selection control message corresponding to at least one entry of the registry. Each entry of the registry associates a respective network partition of the plurality of network partitions with the least one authorization entity. The at least one authorization entity is for granting access to the respective network partition. Each entry of the registry further associates a respective network partition with a service capability of the current operational state of the respective network partition.

According to an example, a device comprises a memory configured to store control instructions. The device further comprises at least one processor. The at least one processor is coupled with a memory. The at least one processor is configured to execute the control instructions. Execution of the control instructions causes the at least one processor to perform: in response to a transition from a previous operational state to a current operational state of a given network partition of a plurality of network partitions of a core of a cellular network: updating a respective entry of a registry of the plurality of network partitions; effecting a network partition selection for a terminal by participating in a push communication of at least one selection control message corresponding to at least one entry of the registry. Each entry of the registry associates a respective network partition of the plurality of network partitions with at least one authorization entity. The at least one authorization entity is for granting access to the respective network partition.

According to an example, a method comprises participating in a communication of at least one selection control message corresponding to a plurality of entries of a registry of a plurality of network partitions of a core of a cellular network. The at least one selection control message is indicative of authorization entities for granting access to the plurality of network partitions. The at least one selection control message is further indicative of service capabilities of current operational states of the plurality of network partitions. The method further comprises, based on the at least one selection control message: executing a network partition selection of a given network partition of the plurality of network partitions for a terminal.

A computer program product, according to an example, comprises instructions which, when carried out by at least one processor, cause the at least one processor to perform a method. The method comprises: participating in a communication of at least one selection control message corresponding to a plurality of entries of a registry of a plurality of network partitions of a core of a cellular network. The at least one selection control message is indicative of authorization entities for granting access to the plurality of network partitions. The at least one selection control message is further indicative of service capabilities of current operational states of the plurality of network partitions. The method further comprises, based on the at least one selection control message: executing a network partition selection of a given network partition of the plurality of network partitions for a terminal.

A computer program, according to an example, comprises instructions which, when carried out by at least one processor, cause the at least one processor to perform a method. The method comprises: participating in a communication of at least one selection control message corresponding to a plurality of entries of a registry of a plurality of network partitions of a core of a cellular network. The at least one selection control message is indicative of authorization entities for granting access to the plurality of network partitions. The at least one selection control message is further indicative of service capabilities of current operational states of the plurality of network partitions. The method further comprises, based on the at least one selection control message: executing a network partition selection of a given network partition of the plurality of network partitions for a terminal.

According to an example, an entity comprises a module for participating in a communication of at least one selection control message corresponding to a plurality of entries of a registry of a plurality of network partitions of a core of a cellular network. The at least one selection control message is indicative of authorization entities for granting access to the plurality of network partitions. The at least one selection control message is further indicative of service capabilities of current operational states of the plurality of network partitions. The entity further comprises a module for, based on the at least one selection control message, executing a network partition selection of a given network partition of the plurality of network partitions for a terminal.

According to an example, a method comprises participating in a push communication of at least one selection control message corresponding to a plurality of entries of a registry of a plurality of network partitions of a core of a cellular network. The at least one selection control message is indicative of authorization entities for granting access to the plurality of network partitions. Based on the at least one selection control message, the method further comprises executing a network partition selection of a given network partition of the plurality of network partitions for a terminal.

A computer program product, according to an example, comprises instructions which, when carried out by at least one processor, cause the at least one processor to perform a method. The method comprises: participating in a push communication of at least one selection control message corresponding to a plurality of entries of a registry of a plurality of network partitions of a core of a cellular network. The at least one selection control message is indicative of authorization entities for granting access to the plurality of network partitions. Based on the at least one selection control message, the method further comprises executing a network partition selection of a given network partition of the plurality of network partitions for a terminal.

A computer program, according to an example, comprises instructions which, when carried out by at least one processor, cause the at least one processor to perform a method. The method comprises: participating in a push communication of at least one selection control message corresponding to a plurality of entries of a registry of a plurality of network partitions of a core of a cellular network. The at least one selection control message is indicative of authorization entities for granting access to the plurality of network partitions. Based on the at least one selection control message, the method further comprises executing a network partition selection of a given network partition of the plurality of network partitions for a terminal.

According to an example, an entity comprises a module for participating in a push communication of at least one selection control message corresponding to a plurality of entries of a registry of a plurality of network partitions of a core of a cellular network. The at least one selection control message is indicative of authorization entities for granting access to the plurality of network partitions. The entity further comprises a module for, based on the at least one selection control message, executing a network partition selection of a given network partition of the plurality of network partitions for a terminal.

According to an example, a device comprises a memory. The memory is configured to store control instructions. The device further comprises at least one processor coupled with a memory. The at least one processor is configured to execute the control instructions. Execution of the control instructions causes the at least one processor to perform: participating in a communication of at least one selection control message corresponding to a plurality of entries of a registry of a plurality of network partitions of a core of a cellular network. The at least one selection control message is indicative of authorization entities for granting access to the plurality of network partitions and is further indicative of service capabilities of current operational states of the plurality of network partitions; and based on the at least one selection control message: executing a network partition selection of a given network partition of the plurality of network partitions for a terminal.

According to an example, a device comprises a memory. The memory is configured to store control instructions. The device further comprises at least one processor. The at least one processor is coupled with a memory. The at least one processor is configured to execute the control instructions. Execution of the control instructions causes the at least one processor to perform: participating in a push communication of at least one selection control message corresponding to a plurality of entries of a registry of a plurality of network partitions of a core of a cellular network. The at least one selection control message is indicative of authorization entities for granting access to the plurality of network partitions. Execution of the control instructions further causes the at least one processor to perform: based on the at least one selection control message, executing a network partition selection of a given network partition of the plurality of network partitions for a terminal.

According to an example, a method comprises effecting a transition from a previous operational state to current operational state of a given network partition of a plurality of network partitions of a core of a cellular network. The method further comprises effecting updating of a respective entry of a registry of the plurality of network partitions by participating in the communication of at least one registration control message. The at least one registration control message is indicative of at least one authorization entity for granting access to the given network partition and is further indicative of a service capability of the current operational state of the given network partition.

A computer program product, according to an example, comprises instructions which, when carried out by at least one processor, cause the at least one processor to perform a method. The method comprises: effecting a transition from a previous operational state to current operational state of a given network partition of a plurality of network partitions of a core of a cellular network. The method further comprises effecting updating of a respective entry of a registry of the plurality of network partitions by participating in the communication of at least one registration control message. The at least one registration control message is indicative of at least one authorization entity for granting access to the given network partition and is further indicative of a service capability of the current operational state of the given network partition.

According to an example, a computer program comprises instructions which, when carried out by at least one processor, cause the at least one processor to perform a method. The method comprises: effecting a transition from a previous operational state to current operational state of a given network partition of a plurality of network partitions of a core of a cellular network. The method further comprises effecting updating of a respective entry of a registry of the plurality of network partitions by participating in the communication of at least one registration control message. The at least one registration control message is indicative of at least one authorization entity for granting access to the given network partition and is further indicative of a service capability of the current operational state of the given network partition.

According to an example, an entity comprises a module for effecting a transition from a previous operational state to current operational state of a given network partition of a plurality of network partitions of a core of a cellular network. The entity further comprises a module for effecting updating of a respective entry of a registry of the plurality of network partitions by participating in the communication of at least one registration control message. The at least one registration control message is indicative of at least one authorization entity for granting access to the given network partition and is further indicative of a service capability of the current operational state of the given network partition.

According to an example, a device comprises a memory. The memory is configured to store control instructions. The device further comprises at least one processor coupled with a memory. The at least one processor is configured to execute the control instructions. Execution of the control instructions causes the at least one processor to perform: effecting a transition from a previous operational state to a current operational state of a given network partition of a plurality of network partitions of a core of a cellular network; and effecting updating of the respective entry of a registry of the plurality of network partitions by participating in communication of at least one registration control message. The at least one registration control message is indicative of at least one authorization entity for granting access to the given network partition and further indicative of a service capability of the current operational state of the given network partition.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 13 is a signaling diagram illustrating an update of an entry of a registry of network partitions according to various embodiments, wherein FIG. 13 illustrates decommissioning of a network partition.

FIG. 14 is a signaling diagram illustrating an update of an entry of a registry of network partitions according to various embodiments, wherein FIG. 13 illustrates decommissioning of a network partition.

FIG. 15 is a signaling diagram illustrating an update of an entry of a registry of network partitions according to various embodiments, wherein FIG. 13 illustrates decommissioning of a network partition.

DETAILED DESCRIPTION OF EMBODIMENTS

Figure 1:
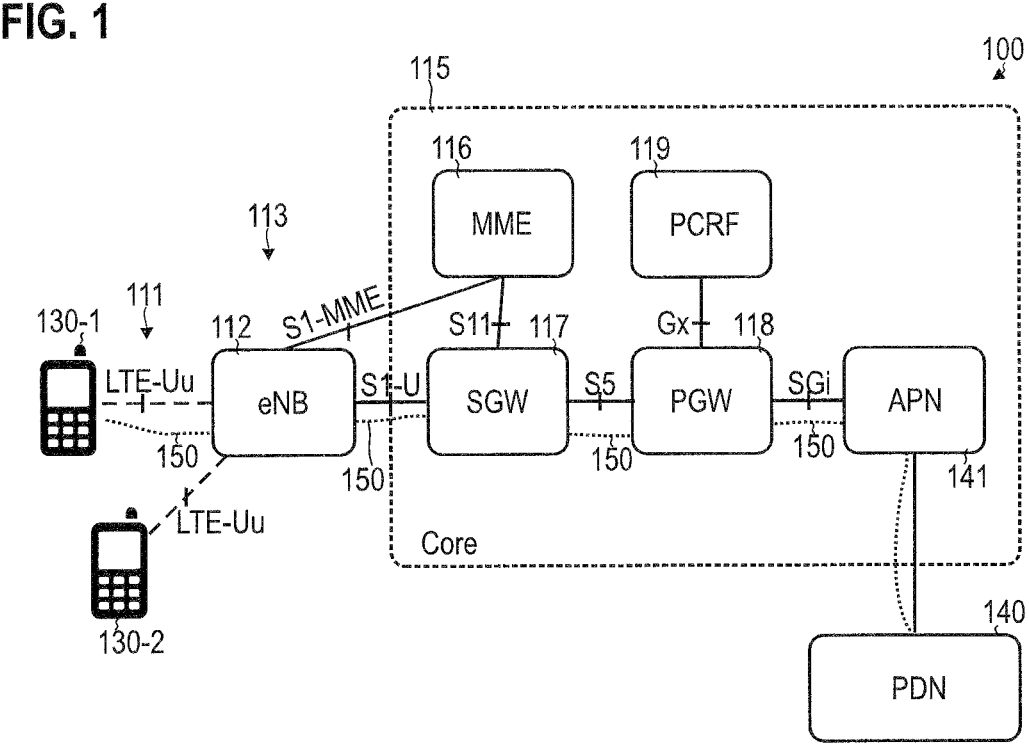
FIG. 1 schematically illustrates a cellular network comprising a radio access network and a core network according to reference implementations.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques relate to updating and/or maintaining a registry of a plurality of network partitions of a core of a cellular network. In some examples, a dynamic registration mechanism to maintain a current set of network partitions is described. These techniques may rely on the communication of registration control message which includes the necessary information to update the registry. This may enable network partitions to be created/commissioned and destroyed/decommissioned on an ad-hoc basis. Likewise, changes of the operational state associated with different service capabilities may be performed on an ad-hoc basis. Thereby, an overview of the currently available network partitions may be maintained up-to-date. The techniques may enable to keep an up-to-date registry of the network partitions.

Various examples relate to distributing information of updates to the registry. Here, a selection control message may be communicated. The selection control message may include information relevant for performing network partition selection. By transmitting the selection control message, network partition selection is thus effected. Thereby, the entities performing selection of a network partition can be kept up-to-date with the changes.

In some examples, the network partitions are associated with at least one authorization entity. An example of an authorization entity is the 3GPP-specified MME. However, in other examples, other authorization entities may be employed. The authorization entity can be configured to grant access to the particular network partition. Thereby, terminals can connect to network partitions via the associated at least one authorization entity. In some examples, the entry of the registry of a given network partition may include information on the associated at least one authorization entity. This information may include an address of the at least one authorization entity. This information may include the registration mechanism for the at least one authorization entity. In some examples, the registration mechanisms for accessing the at least one authorization entity and the corresponding network partition may be co-implemented.

Some examples relate to executing the network partition selection. The network partition selection may be based on information obtained from the registry, e.g., by means of the selection control message. In one example, once the entry of a given network partition has been updated, corresponding information may be pulled or pushed to the appropriate entities responsible for network partition selection. To this respect, the at least one selection control message may be communicated, e.g., in a push communication. An example push communication that may be employed in various example implementations is described in: Internet Engineering Task Force (IETF): "DNS Push Notifications" of Mar. 9, 2015.

In one example, one or more corresponding entries of the registry may be pushed to the entity for performing the network partition selection if a network partition comprising an authorization entity is instantiated or destroyed. Generally, the trigger for a push communication may be a change in the operational state of the network partition.

Different operational states of the network partitions may be associated with different service capabilities of the network partitions. Such service capabilities may correspond to one or more of the following: latency; capacity; encryption; supported applications; etc. E.g., the service capabilities may correspond to support of delay critical terminals, e.g., critical machine-type communication. E.g., the service capabilities may correspond to support of mobility of connected terminals: in some example, terminals expected to be less mobile can be connected to a more simple network partition. E.g., the service capabilities may correspond to a supported class of terminals such as machine-type communication devices, end-user handheld devices, etc.

The distribution of information from the registry can be implemented in various manners. In some examples, it is possible to selectively inform a subset of all available entities for performing the network partition selection about a change in the respective entries of the registry, e.g., depending on the particular operational state. Alternatively or additionally, the entity for performing the network partition selection can indicate which operational states of network partitions it is interested in, e.g., by indicating requested specific capabilities of the network partition that it can support, etc.

By the techniques described herein, various effects may be achieved.

By employing the techniques disclosed herein, cellular networks may be implemented more flexible and may be able to support dynamic changes to the operational modes of the network partitions. I.e., network partitions may be commissioned and decommissioned in a more dynamic fashion to serve different kind of use scenarios or use cases. Network partitions may be created for short-term needs, such as for new roaming use cases. Network partitions could be created on a need basis for roaming users.

The network partition selection may be aware of the current set of network partitions without using periodic polling. E.g., the device executing the network partition selection may not be required to poll for information about the available network partitions frequently. As the network partitions can be expected to be more dynamic than the mobile networks today, polling wouldn't be a suitable mechanism for dynamic network partitions appearing and disappearing at unpredictable intervals.

In some examples, there may be no need for manual configuration of the entity performing the network partition selection with respect to the available network partitions. E.g., there may be no need to manually configure the address of the associated at least one authorization entity or identities of the network partitions. This may enable automatic network operation which in turn may decrease operational costs for the network.

FIG. 1 schematically illustrates an architecture of a cellular network 100 which may be used for implementing the concepts as outlined above and hereinafter. FIG. 1 is an example disclosed in the context of the 3GPP Long Term Evolution (LTE) for illustrative purposes only.

Similar techniques as disclosed herein can be readily applied to various kinds of 3GPP-specified networks, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). Similar techniques may be applied to upcoming 3GPP 5G technology. However, operation of the network is not limited to the scenario of a cellular network or a 3GPP-specified network. E.g., at least parts of the radio link(s) of the wireless network could be operated according to the Wireless Local Area Network (WLAN or Wi-Fi) radio access technology (RAT), Bluetooth, Near Field Communication, or satellite communication.

In FIG. 1, two terminals 130-1, 130-2 are connected to a BS implemented by an evolved Node B (eNB) 112. The eNB 112 and the terminals 130-1, 130-2 communicate using packetized traffic via a radio link 111. Various channels may be implemented on the radio link 111 for utilizing communication of data via the radio link 111. Such channels may include logical channels. The channels may be associated with dedicated time-frequency resources on the radio link 111. The channels may include a Physical DL Control Channel (PDCCH) corresponding to a DL control channel, a Physical UL Control Channel (PUCCH) corresponding to an UL control channel, a Physical DL Shared Channel (PDSCH) corresponding to a DL payload channel, and a Physical UL Shared Channel (PUSCH) corresponding to a UL payload channel. The channels may also include a Physical Hybrid Automatic Repeat Request Indicator Channel (PHICH) usable for re-transmission control of payload data.

In FIG. 1, the terminal 130-1 is connected to a packet data network (PDN) 140 via a bearer 150 (illustrated by the dotted line in FIG. 1) and to an access point node 141. The PDN 140 may offer a service such Voice over LTE (VoLTE) to the terminal 130. The PDN 140 may implement an IP Multimedia Subsystem (IMS) or may be connected to the Internet. E.g., the bearer 150 may be implemented by a plurality of interconnecting sub-bearers and/or secure tunnels facilitating communication of data. E.g., the bearer 150 may be identified by an Internet Protocol (IP) address of the terminal 130-1. E.g., the bearer 150 may be identified by a bearer identification (bearer ID). The bearer 150 is typically associated with a certain quality of service (QoS) requirement. E.g., the QoS requirement may be specified by a QoS class identifier (QCI) associated with the bearer 150.

FIG. 1 further schematically illustrates the evolved packet system (EPS) architecture of the LTE RAT. The EPS comprises an evolved packet core (EPC) as a core network 115 and the evolved UMTS Terrestrial Radio Access (E-UTRA) 113.

The reference point—typically also called "interface"—implemented by the radio link 111 between the terminals 130-1, 130-2 and the eNB 112 operates according to the LTE-uU protocol. The bearer 150 may pass along the radio link 111.

The eNB 112 is connected to a Serving Gateway (SGW) 117 implementing a gateway between the radio access network and the core network. As such, the SGW 117 may route and forward data and may act as a mobility anchor of the user plane during handovers of the terminals 130-1, 130-2 between different cells of the cellular network 100. The reference point between the eNB 112 and the SGW 117 operates according to the S1-U protocol.

The SGW 117 is connected via a reference point operating according to the S5 protocol to a further gateway node implemented by, e.g., a Packet Data Network Gateway (PGW) 118. The PGW 118 serves as a point of exit and point of entry of the cellular network 100 for data packets of the bearer 150 towards the PDN 140. As such, the PGW is connected with the access point node 141 of the PDN 140 via a reference point operating according to the SGi protocol.

Authorization and access functionalities of the terminals 130-1, 130-2 to the PDN 140, e.g., access functionality to the bearer 150, may be controlled by the MME 116. The MME 116 is connected via a reference point operating according to the S1-MME protocol with the eNB 112. Further, the MME 116 is connected via a reference point operating according to the S11 protocol with the SGW 117.

E.g., the MME 116 may check whether a subscriber is authorized to access the EPC 115. Thus, the MME 116 may implement authorization functionality.

E.g., the MME 116 may check whether a subscriber is authorized to establish the bearer 150. E.g., the MME 116 may check whether the subscriber associated with the terminal 130 is authorized to establish the bearer 150 by accessing the access point node 141. The MME 116 typically plays an important role and is a main signaling node in the EPC 115. It is responsible for authentication of the terminals 130-1, 130-2 and of other control functions. The MME 116 also selects the appropriate SGW 117 and/or PGW 118 during the initial registration process taking, e.g., based on the location of the respective terminal 130-1, 130-2. Multiple MMEs 116 can be grouped together in a pool to meet increasing signaling load in the network 100. The MME 116 may be responsible for several functions including network access control, resource management, mobility management, roaming, and lawful intercept among other things.

Typically, an Internet Domain Name System (DNS) is widely used to handle the selection of MME 116 along with the selection of PGW 118, SGW 117, Serving GPRS Support Node (SGSN) and Home Subscriber Server (HSS) within the network 100. As the interface in the EPC 115 between the eNB 112 and the DNS server is not standardized, there exist different variations according to reference implementations of how the eNB 112 may learn about the available MMEs 116 from the DNS server. E.g., some reference implementations require the eNB 112 to poll the DNS server periodically with low periodicity, e.g., a number of hours, to get an updated list of the address of the MME 116. The eNB 112 then selects one of the MMEs 116 from the provided set based on, e.g., relative weights for load balancing and contacts the selected MME 116 during the attach procedure. The eNB 112 might query the DNS Server using the Tracking Area Identity (TAI) for the list of available MME addresses according to reference implementations.

Policy and charging functionality of the bearer 150 is controlled by a control node 119 implemented for example by a Policy and Charging Rules Function (PCRF) 119. The PCRF 119 is connected via a reference point operating according to the Gx protocol with the PGW 118. The PGW 118 may implement a Policy and Charging Policy and Charging Enforcement Function (PCEF) which is controlled by Policy and Charging Control (PCC) rules provided by the PCRF 119 via the Gx protocol.

The architecture of the EPC 115 was designed with idea of a single operator owning and running the entire physical infrastructure. The architecture and its components are typically statically configured requiring few and far-apart changes/updates, if any. These changes are mostly done manually. The techniques described herein enable more flexible changes to the EPC 115.

Figure 2:
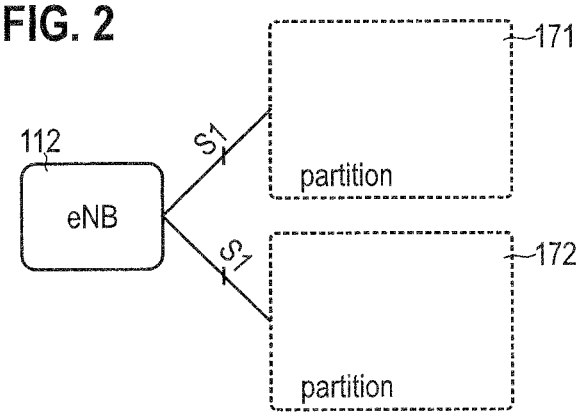
FIG. 2 schematically illustrates multiple network partitions of a core network of a cellular network according to various embodiments.

FIG. 2 schematically illustrates aspects with respect to a plurality of network partitions 171, 172 of the EPC 115. A network partition 171, 172 may define a logical instantiation of the functionality provided by the EPC 115. Different network partitions 171, 172 may or may not share the same hardware. E.g., there might be several network partitions 171, 172 belonging to different operators, each network partition 171, 172 having its own authorization entity—such as an MME 116—for granting access to the respective network partition 171, 172.

The particular implementation of a network partition 171, 172 is not germane to the various techniques described herein with respect to implementing the registry of the plurality of network partitions and network partition selection.

Network partition selection corresponds to selecting a particularly suitable network partition 171, 172 from all available network partitions 171, 172. This may involve different considerations, including: load balancing; service capabilities; quality of service; etc. Network partition selection may correspond to elements of the group comprising: checking which network partitions 171, 172 are available for subscription; checking which network partitions 171, 172 currently offer desired service capabilities; requesting access to a selected one of the available network partitions 171, 172, e.g., via an associated authorization entity for granting access to the respective network partition 171, 172.

Generally, it is possible that a given terminal 130-1, 130-2 is connected with more than one network partition 171, 172 at a given moment in time.

Figures 3A, 3B:
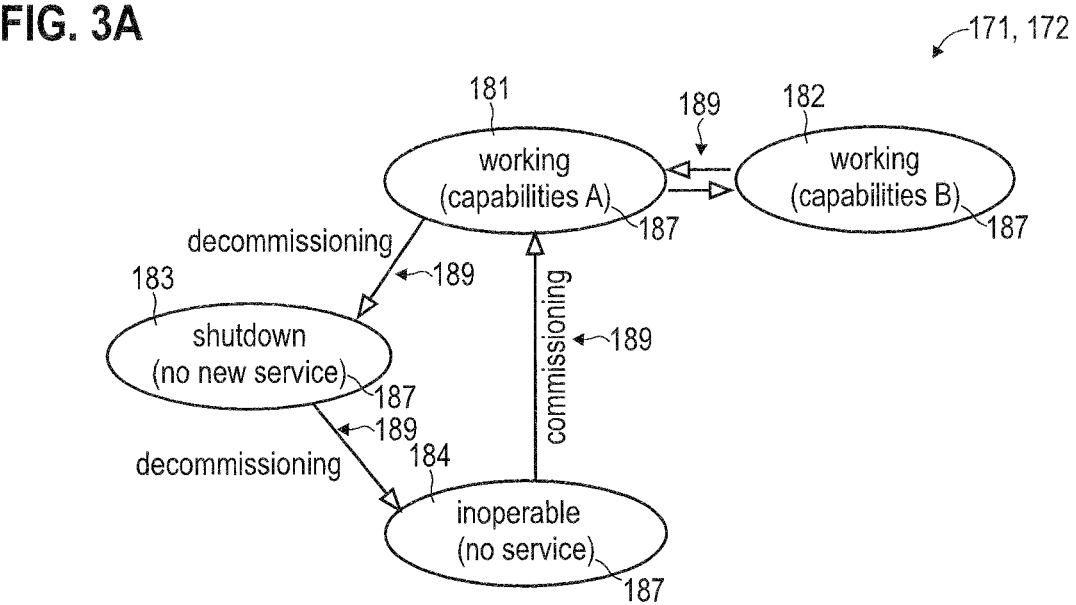
FIG. 3A is a state diagram illustrating transitions between various operational states of network partitions.
FIG. 3B schematically illustrates a registry comprising a plurality of entries corresponding to a plurality of network partitions.

FIG. 3A is a state diagram illustrating various aspects with respect to operational states 181-184 of a given network partition 171, 172. Further, FIG. 3A illustrates various aspects with respect to transitions 189 between the operational states 181-184.

The operational states 181-184 are associated with different service capabilities 187 of the respective network partition 171, 172. The service capabilities 187 can define what services are offered by the respective network partition 171, 172 to which terminal 130-1, 130-2. Examples of service capabilities 187 comprise access to certain PDNs 140, low-latency core network signaling, etc.

The operational states 181, 182 correspond to the given network partition 171, 172 being fully operable. However, the two operational states 181, 182 are associated with different service capabilities 187.

The operational state 184 corresponds to the respective network partition 171, 172 being inoperable. Thus, the respective network partition 171, 172 is shut down and does not offer services of any kind. The respective network partition 171, 172 is decommissioned. Any attempt to connect to the respective network partition 171, 172 is deemed to fail.

The operational state 183 corresponds to an intermediate state between fully operable operating states 181, 182 and fully inoperable operational state 184. E.g., the operational state 183 could be associated with limited service capabilities 187: in the example of FIG. 3A, the network partition 171, 172 continues to support legacy connections initiated during one of the operational states 181, 182; but does not allow for setup of any additional connections. E.g., additional terminals 130-1, 130-2 may be prevented from connecting to the respective network partition 171, 172.

The transition 189 from the operational state 184 to the operational state 181 corresponds to a commission of the respective network partition 171. Likewise, the transition 189 from the operational state 183 to the operational state 183 corresponds to a decommission of the respective network partition 172. Also, the transition from the operational state 183 to the operational state 184 corresponds to the decommission of the respective network partition 171, 172. The decommission of a given network partition 171, 172 thus corresponds to destroying or preparing for destruction the respective network partition 171, 172. One example where a network partition 171, 172 is decommissioned: the corresponding network partition 171, 172 is commissioned for a user performing roaming. If the subscriber then leaves the country/area triggering the need for the roaming network partition 171, 172, it is possible to decommission that roaming network partition 171, 172.

A registry may keep track of the active operational states 181-184 of the various network partitions 171, 172. In particular, it is possible that update of the registry is triggered by one of the transitions 189.

FIG. 3B schematically illustrates the registry 190 of a plurality of network partitions 171, 172. The registry 190 facilitates efficient and up-to-date network partition selection for the terminals 130-1, 130-2.

In the example of FIG. 3B, the registry 190 comprises two entries 191, 192. Each entry is associated with a particular network partition 171, 172. Each entry 191, 192 of the registry 190 associates the respective network partition 171, 172 with a certain MME 117. For this, the respective entries 191, 192 comprise the addresses 175 of the respective MME 117 for granting access to the respective network partition 171, 172. Generally, various information on the MME 117 may be stored: In case of 3GPP LTE, these may include: Globally Unique MME Identifier (GUMMEI), served TAIs, etc. In an example technique of registering the authorization entity 252, an address of the authorization entity 252 of the following format could be used: "mmec.mmegi.sliceid.plmnid.infrastructureprovider.com::92d:d16b:e4e1:25f7/64" where plmnid is the Public Land Mobile Network Identity; sliceid is the Identity of the network partition being instantiated or used; MMEC is the code that uniquely identifies the MME 116 within a pool. MMEGI is the MME Group Identity. infrastructureprovider.com is an example of a domain named used by a physical network provider. The network partition s171, 172 may register this along with the IPv4/IPv6/link layer address assigned to the authorization entity 252, for example: (::92d:d16b:e4e1:25f7/64). If a network partition 171, 172 is associated with a plurality of authorization entities 252, it can register all of them in a similar fashion following the scheme proposed above.

In the example of FIG. 3B, each entry 191, 192 of the registry 190 further associates the respective network partition 171, 172 with the current operational state 181-184 of the respective network partition 171, 172. As such, the respective entries 191, 192 associate particular service capabilities 187 with the respective network partitions 171, 172. By providing information on the particular service capabilities 187 in the registry 190, an up-to-date and well-informed network partition selection becomes possible. It is possible to execute the network partition selection based on a terminal-specific demands for service capabilities.

Figure 4:
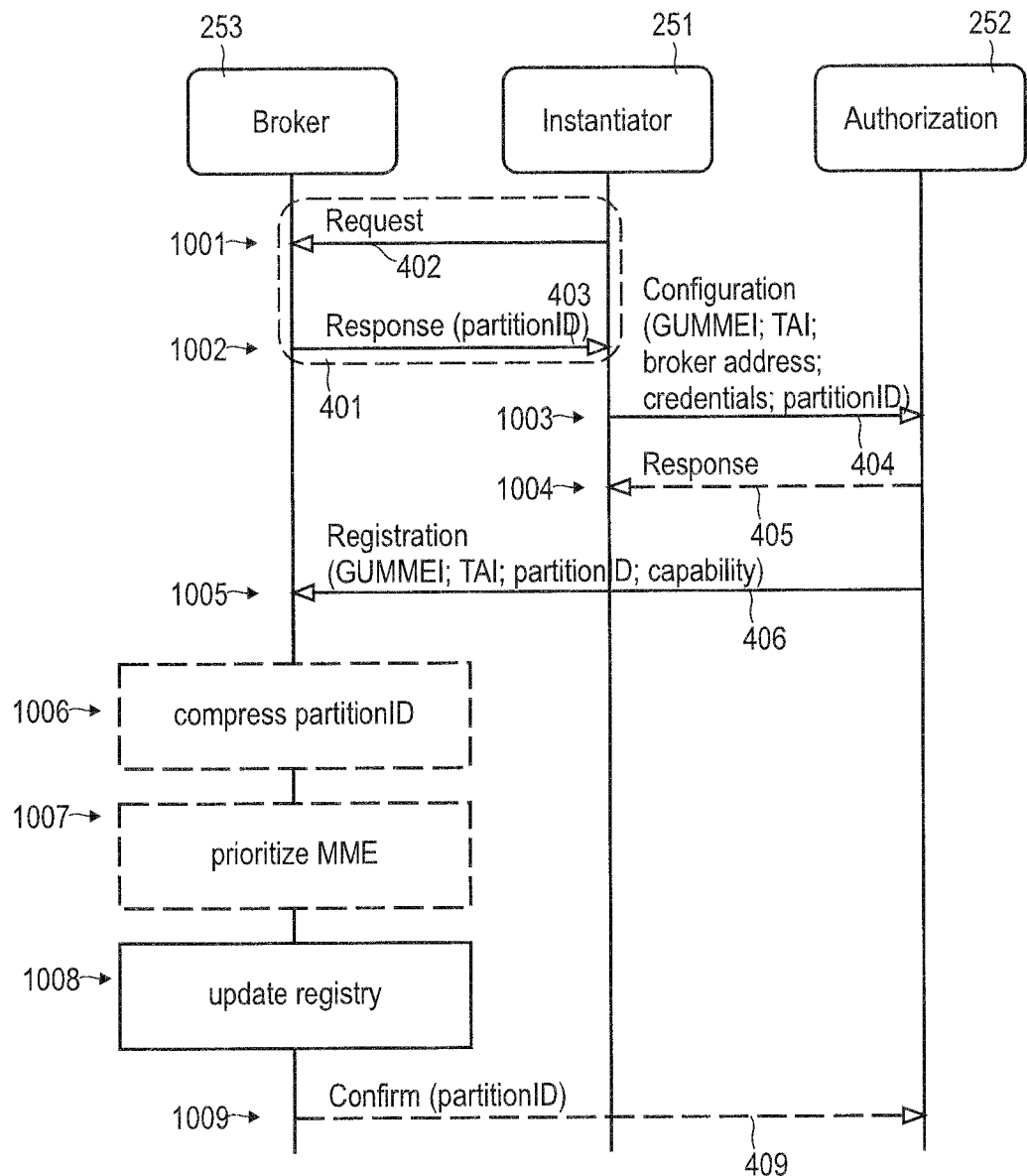
FIG. 4 is a signaling diagram illustrating an update of an entry of the registry of network partitions according to various embodiments.

FIG. 4 is a signaling diagram illustrating aspects of updating entries 191, 192 of the registry 190. These techniques enable to address scenarios where network partitions 171, 172 transition between different operational states 181-184 in a dynamic fashion and comparably frequently. The techniques enable to dynamically and automatically keep track of the current operational state 181-184 and the associated service capabilities 187 of the various network partitions 171, 172.

In FIG. 4—and the following FIGs.—reference is made to the authorization entity 254. The authorization entity 254 may be implemented in hardware and/or software. The authorization entity 254 is configured to grant access to the network partitions 171, 172. The authorization entity 254 may be embodied by different devices, e.g., by the MME 116, the SGW 117, and/or the PGW 118.

In the example of FIG. 4, the registry 190 of network partitions 171, 172 is implemented on a so-called broker 253. The broker 253 may be implemented in hardware and/or software. The broker 253 maintains the registry 190 as an up-to-date list of network partitions 171, 172, authorization entities 252, and the cross-mapping/associations between these. In one example, the broker 253 may be implemented based on the concept of a DNS server or a MQTT broker or using Diameter entities. DNS, MQTT, or Diameter entities are example implementations of the broker 253. In practice, the specific combination of protocol and database for implementing the functionality may vary. The broker 253 may be implemented either as a centralized entity, or distributed such as using distributed databases or running on distributed physical realizations.

The entity labeled instantiator 251 may be part of the operator service system (OSS).

In FIG. 4 an example of commission of a network partition 171, 172 is illustrated. This may correspond to the transition 189 from the operational state 184 to the operational state 181 (cf. FIG. 3A). Commission—sometimes referred to as instantiation—could be triggered by a human or automatically. The particular technique of creating a network partition 171, 172 is not germane for the functioning of the techniques described herein.

At 1001, the instantiator 251 sends a request control message 402 which is received by the broker 253. The instantiator 251 requests an identity for the network partition 171, 172 to be created. The broker 253 then sends a response message 403 which is received by the instantiator 251, 1002. The response message 403 comprises the identity of the network partition 171, 172.

1001 and 1002 form block 401. Block 401 is optional. Block 401 ensures that a unique identity is assigned to the network partition 171, 172. This is because the identities of network partitions 171, 172 may be centrally assigned by the broker 253.

Then, at 1003, the authorization entity 252 of the network partition 171, 172 being instantiated receives a control message 404 from the instantiator 251. This control message 404 includes the address of the broker 253 where the authorization entity 252 should register at, including its address and associated parameters.

Additionally, the configuration message 404 also comprises the identity of the network partition 171, 172 to be instantiated.

Various implementations are conceivable for the identity of the network partition communicated via the control message 404. This identity may be a temporary identity assigned by the instantiator 251, e.g., if 401 is not executed. The broker 253 may then later on translate the temporary identity of the network partition 171, 162 into a permanent one that can be used in the system. E.g., the permanent identity may be communicated at 1009 as part of the respective control message 409. In other examples, e.g., if 401 is executed, this identity may be a permanent one as received via the control message 403. In still further examples, the instantiator 251 may autonomously assign a unique identity for the network partition. This can done, e.g., by using a unique identity of the instantiator 251, e.g., its IP address or name, followed by a unique identity of the respective network partition 171, 172. This identity may then be sent from the instantiator 251 to the authorization entity at 1003, and then communicated from the authorization entity 252 to the broker 253 at 1005. In such a scenario, there is no need to execute block 401.

The configuration message 404 may also provide credentials which can be used, e.g., by an operator intending to commission the network partition 171, 172. The credential enable to securely authenticate to the broker 253 and securely register the authorization entity 252. These credentials could be for example a shared-secret for setting up transport layer security (DTLS/TLS) or OAuth tokens. This setup allows for network partitions 171, 172 run by virtual network operator as well as network partitions 171, 172 run by a non-virtual network operators.

A confirmation message 405 is sent by the authorization entity 252 to the instantiator 251, 1004.

After instantiation, the authorization entity 252 of the network partition uses the information included in the control message 404 to register the authorization entity 252 and the associated network partition 171, 172 to the broker 253; this may include the address and associated parameters of the authorization entity 252—e.g., GUMMEI and/or TAI—, as well as the identity of the network partition 171, 172 which is being instantiated or used. In some examples, it would also be possible to instantiate a new network partition 171, 172 using the existing authorization entities 253—in which case only the identity of the new network partition 171, 172 supported by the pre-instantiated authorization entity 252 need to be registered. At 1005, the authorization entity 252 sends a respective control message 406 to the broker 253.

It is possible to include in the control message 406 other properties of the network partition 171, 172 as well; such other properties may include delay properties, reliability class, business ownership, set of functionality, intended purpose, area limitations such as a tracking area, and/or time restrictions, etc. Thus, generally, the service capabilities 187 and/or the current operational state 181-184 may be indicated by the control message 406. This type of information may be communicated further from the broker 253 to the selector, as will be explained further below. This type of information may be communicated to other entities as well responsible for the bootstrapping of user devices.

In case the instantiation of a new network partition 171, 172 involves one or more new authorization entities 252 to be instantiated, the registration is performed for each authorization entity 252. Here, message aggregation, e.g., with respect to the control message 406 may be implemented.

At optional block 1006, it is possible for the broker 253 to map the identity of the network partition 171, 172 received from the authorization entity 252—or previously assigned at block 401—into a short network partition identity (compression). This can help to represent the identity of the network partition 171, 172 in fewer bits. This may be useful, e.g., when the identity of the network partition 171, 172 is communicated in messages over the air interface which are of limited length.

In the case of compression, the broker 253 can inform the authorization entity 252 about the compressed identity of the network partition 171, 172 to be used for the given network partition (not shown in FIG. 4).

Alternatively or additionally, it is likewise possible to compress an indicator indicative of the address 175 of the respective authorization entity 252 associated with a given network partition. Here, comparable effects may be obtained as explained above with respect to the identity of the respective network partition 171, 172.

If the network partition 171, 172 is associated several authorization entities 252, a mechanism to differentiate between the various authorization entities 252 may be provided. E.g., the entries 191, 192 of the registry 190 may further associate load balancing priorities with the authorization entities 252. Such priorities may be set at 1007. Thus, it is possible to use the broker 253 to provide information about how the authorization entities 252 should be selected, e.g., indicate a relative weight for load balancing. The weight parameter could be changed when necessary. Alternatively to the broker 253 setting the weigh, the weight can be provided as a parameter from the authorization entity 252 to the broker 253 as part of control message 406 at 1005. Also, the relative weight could be provided to the authorization entity 252 from the instantiator 251 as part of control message 404 at 1003, or from another entity such as an O&M system.

Then, at 1008, the registry 190 may be updated based on the compressed indicator indicative of the address of the authorization entity 252 and/or based on the compressed identity of the respective network partition 171, 172.

A confirmation message 409 is the sent from the broker 253 to the authorization entity 252, 1009. The confirmation message 409 may comprise the network partition identity, e.g., a permanent network partition identity assigned by the broker 253.

Figure 5:
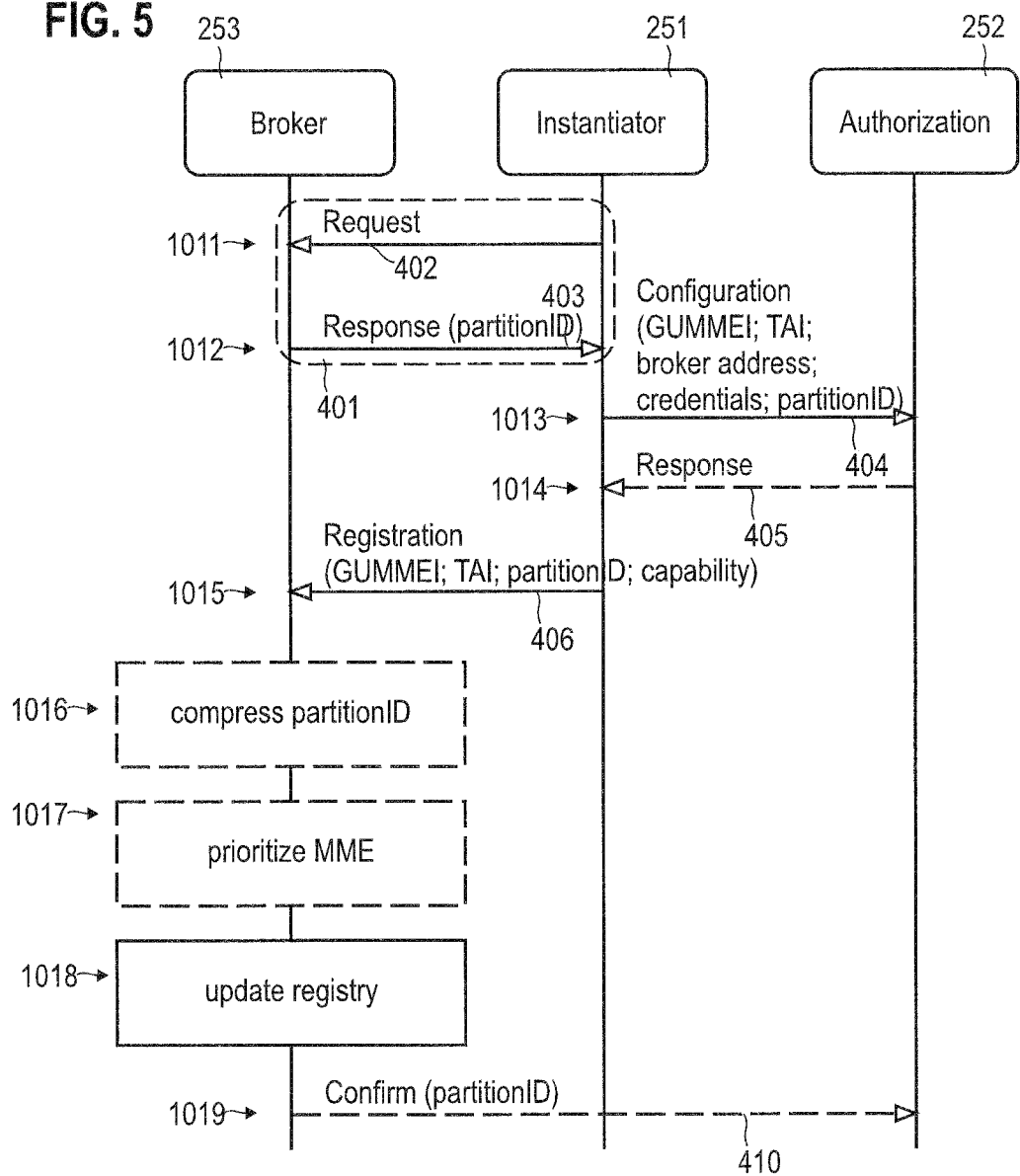
FIG. 5 is a signaling diagram illustrating an update of an entry of the registry of network partitions according to various embodiments.

FIG. 5 is a signaling diagram illustrating aspects of updating entries 191, 192 of the registry 190. These techniques enable to address scenarios where network partitions 171, 172 transition between different operational states 181-184 in a dynamic fashion and comparably frequently.

The scenario FIG. 5 generally corresponds to the scenario FIG. 4. However, in FIG. 5 the instantiator 251—instead of the authorization entity 252—is responsible for registering the authorization entity 252 in the respective network partition 171, 172 to the broker 253. Because of this, the message 406 is sent by the instantiator 251 and received by the broker 253. The respective control message 406 can be sent by the instantiator 251 for each transition 189 triggered with respect to the network partitions 171, 172.

E.g., in the scenario where the instantiator 251 triggers a plurality of transitions 189, it is possible that corresponding information is aggregated into a single control message 406 for the plurality of transitions 189. Separate dedicated messages from the instantiator 251 to the broker 253 are also conceivable.

With respect to FIGS. 4 and 5 above, various examples have been illustrated with respect to updating the registry 190 in response to a transition 189 between two operational states 181-184 of a network partition 171, 172. These examples facilitate keeping up-to-date information at the broker 253. Such up-to-date information facilitates efficient network partition selection for the terminals 130-1, 130-2.

Figure 6:
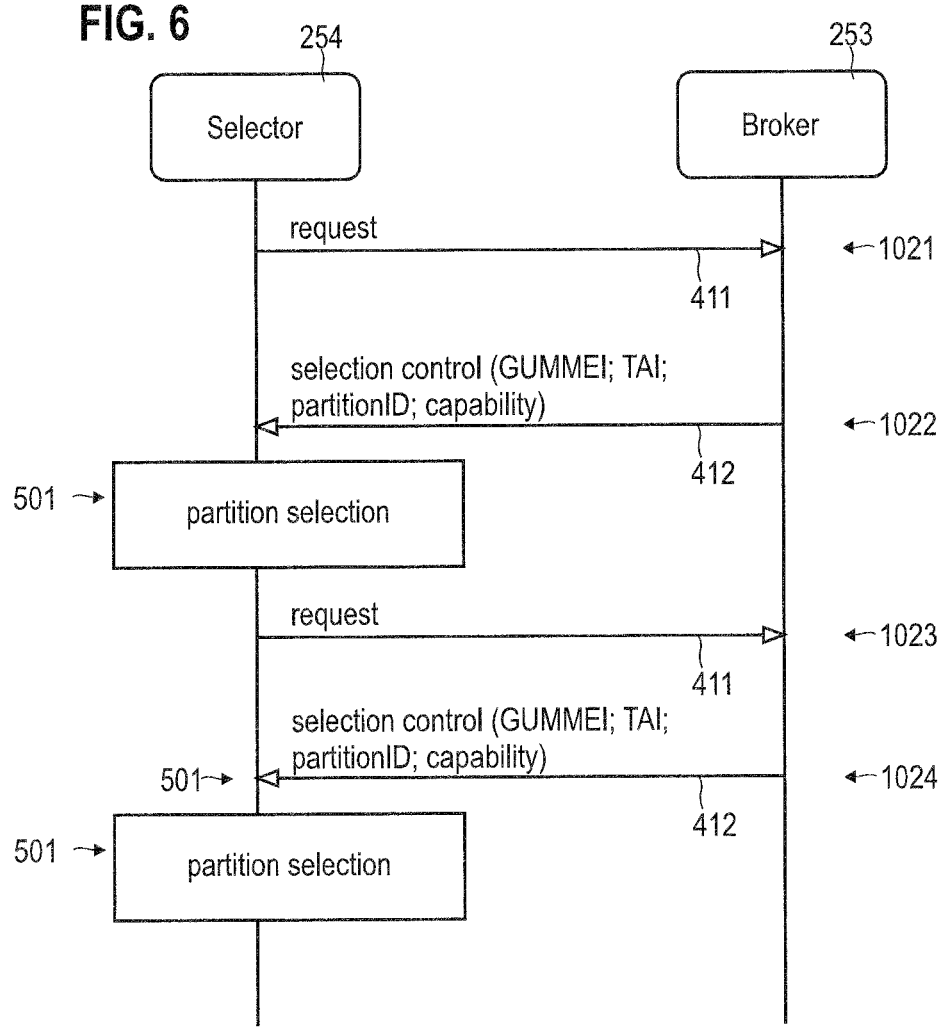
FIG. 6 is a signaling diagram illustrating network partition selection according to various embodiments.

FIG. 6 is a signaling diagram illustrates aspects of network partition selection for a terminal 130-1, 130-2.

FIG. 6 illustrates the selector 254. The selector 254 performs the network partition selection. The selector 254 may be embodied by different entities. In one example, the network partition selection may take place in the eNB 112. This may be a scenario where the terminal 130-1, 130-2 provides some form of identity of the network partition 171, 172, such as in the case of the eDECOR solution being specified in 3GPP. Alternatively or additionally, the network partition selection may take place in the EPC 115, e.g., using a redirection mechanism from one network partition 171, 172 to another; this may be comparable to a 3GPP DECOR-specified solution. In such a scenario, the MME 116 may embody the selector 254. It can also be possible to perform network partition selection in other network entities. It is also possible to combine the solutions and have a multi-stage procedure where an initial network partition selection can be followed by one or multiple re-direction steps. The particular embodiment of the selector 254 is not germane for the functioning of the techniques described herein. There are no restrictions to the particular embodiment of the selector 254. Likewise, there are no restrictions to the count of instances of selectors 254 in the network 100. The count of selectors 254 may be up to, e.g., tens of thousands.

FIG. 6 illustrates aspects with respect of conveying the information maintained in the registry 190 at the broker 253 to the selector 254. In some examples, the broker 253 makes a decision whether or not to convey such information based on the type of the network partition 171, 172; this decision may include the particular instance of the candidate selector 254 to which the respective information of the corresponding entry 191, 192 of the registry 190 is conveyed. In some examples, the selector 254 can indicate criteria to the broker 253: these criteria can specify certain service capabilities of the candidate network partitions 171, 172 for which information is desired. Such information may be provided upon instantiation of the respective selector 254 and/or according to some repetitive timing schedule. Possible service capabilities 187 indicated by the selector 254 may include: type of network partitions 171, 172, tracking area, capacity, functionality, etc. The broker 253 then may analyze the specified service capabilities 187 and decide information on which of network partitions 171, 172 should be conveyed to the requesting selector 254.

In FIG. 6, at 1021, the selector 254 sends a request message 411 to the broker 253. The request message may indicate, as described above, certain desired service capabilities 187 that should be supported by the current operational state 181-184 of the candidate network partitions 171, 172. In other examples, the request message 411 may merely indicator request to provide up-to-date information of the available network partitions 181-187. As such, the request message 411 triggers a pull communication of the control message 412 communicated at 1022 in response to the broker 253 receiving the control message 411.

At 1022, the broker 253 sends the control message 412 to the selector 254. The control message 412 includes information on the various entries 191, 192 of the registry 190 and thus represents up-to-date information on the available network partitions 171, 172. As such, the control message 412 sent by the broker 253 effects the network partition selection 501.

Every time the selector 254 considers that it is in need for updated information of the entries 191, 192 of the registry, it can send a new request control message: 1023, 1024 generally correspond to 1021, 1022.

The selector 254 may cache the information received as part of the control messages 412. Alternatively or additionally, the selector 254 may request the information on-demand.

Figure 7:
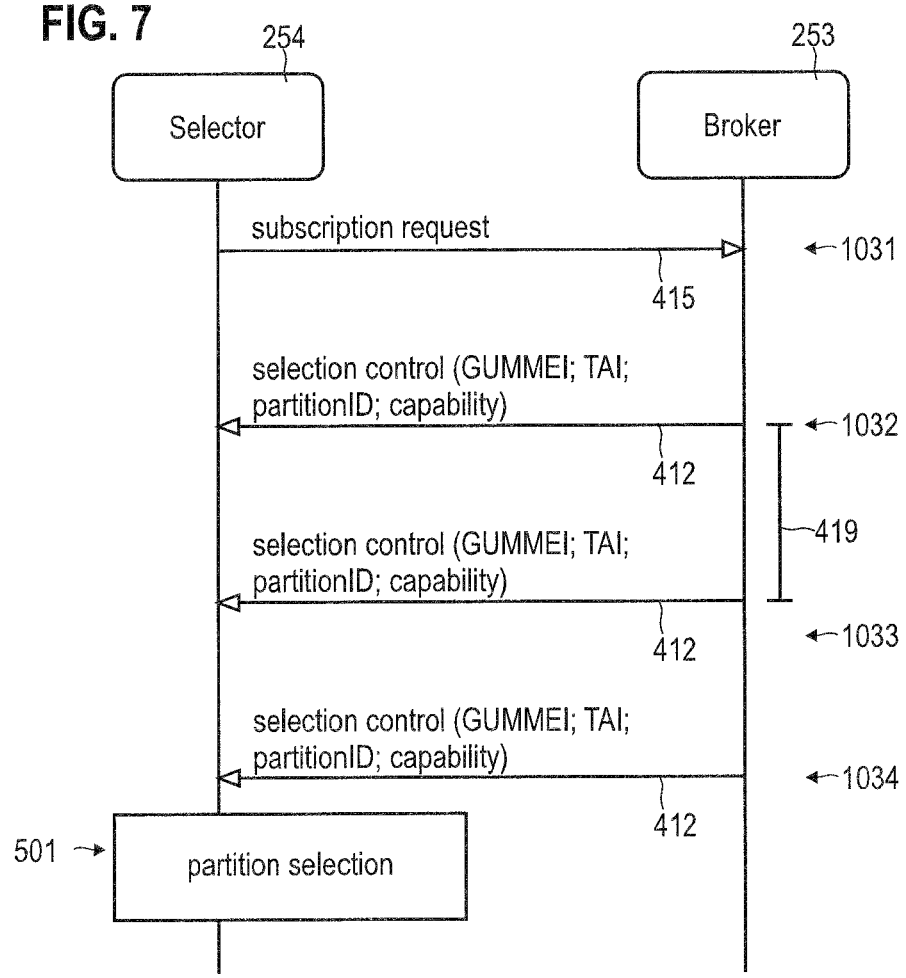
FIG. 7 is a signaling diagram illustrating network partition selection according to various embodiments.

FIG. 7 illustrates aspects with respect to conveying the information maintained in the registry 190 at the broker 253 to the selector 254. FIG. 7, thus, illustrates aspects with respect to effecting network partition selection 501 by the broker 253. In particular, FIG. 7 relates to a push scenario. Here, the selector 254, at 1031, sends a control message 415 which is received by the broker 253. The control message 415 triggers the push communication. The control message 415 triggers the subscription of the selector 254 to notifications from the broker 253.

Then, according to a certain predefined schedule 419, the broker 253 sends control messages 412 to the selector 254, 1032, 1033, 1034. The control messages 412 are transmitted in a push communication. The selector 254, based on the control messages 412, can then perform network partition selection 501. In this manner, the selector 254 is automatically kept up-to-date with the latest information on available network partitions 171, 172 and optionally corresponding authorization entities 252.

Figure 8:
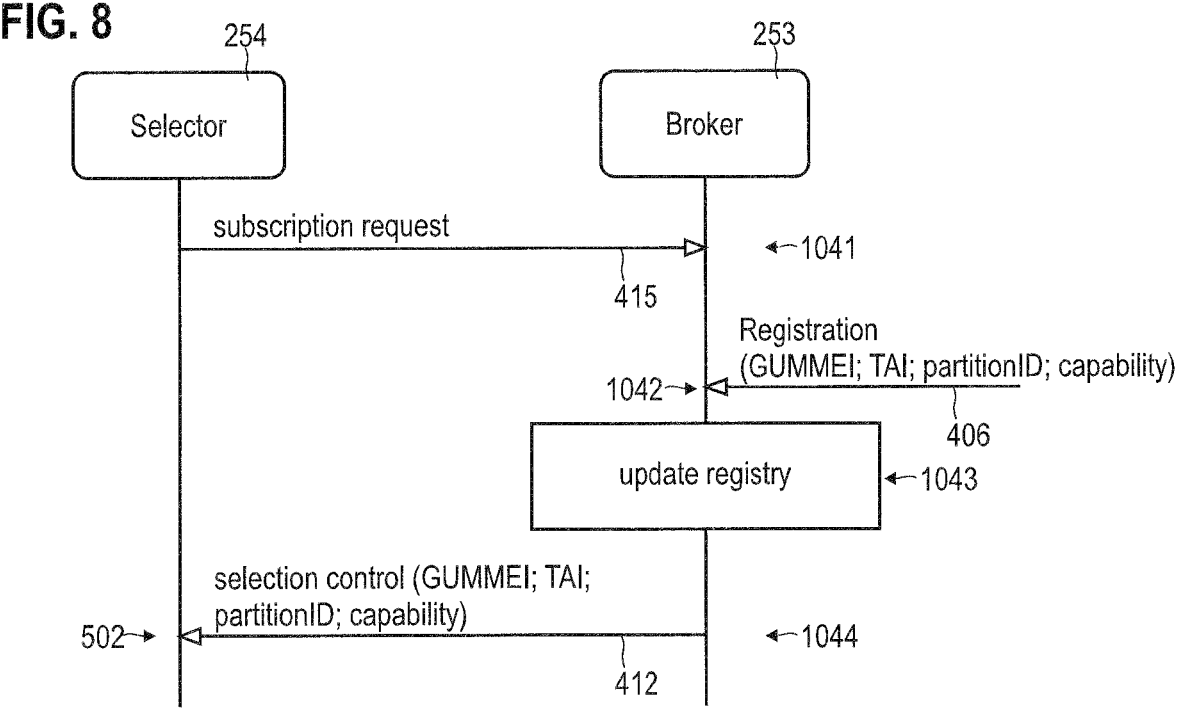
FIG. 8 is a signaling diagram illustrating network partition selection according to various embodiments.

FIG. 8 illustrates aspects with respect to conveying the information maintained in the registry 190 at the broker 253 to the selector 254. FIG. 8, thus, illustrates aspects with respect to effecting network partition selection by the broker 253. In particular, FIG. 8 relates to a push scenario. At 1041, the selector 254 sends a control message 415 which is received by the broker 253. Again, the control message 415 triggers the subscription of the selector 254 to notifications from the broker 253.

Then, whenever an update of an entry 191, 192 the registry 190 occurs (such as at 1042, 1043 in the scenario FIG. 8), the broker 253 sends a corresponding control message 412 to the selector 254, 1044. The control messages 412 are transmitted in a push communication. In this manner, the selector 254 is kept up-to-date with the latest information on available network partitions 171, 172 and optionally corresponding authorization entities 252.

In the scenarios of FIGS. 7 and 8, it would be possible that the control message 415 is indicative of a service request of the selector 254. The service request may correspond to services supported by the selector 254. As such, the service request may correlate with this service capabilities 187 of the network partitions 171, 172. It is possible that the control message 412 which is indicative of an entry 191, 192 of a given network partition 171, 172 is selectively sent by the broker 253 to the selector 254 based on a comparison of the service request with the service capability 187 of the current operational state 181-184 of the given network partition 171, 172. Based on such techniques, it is possible to avoid unnecessary signaling of information to the selector 254. In particular, the information distributed by the broker 253 to the selector 254 can be tailored to the needs of the selector 254. Thereby, it may be possible that the selector 254 only receives information on those network partitions 171, 172 which are feasible candidates given the service requirements of the respective selector 254.

In some examples, it is possible that the service request of the selector 254 is determined based on capabilities of the selector 254 itself. In further examples, it is possible alternatively or additionally that the service request of the selector 254 is at least partially determined based on capabilities of a terminal 130, 130-1, 130-2 seeking to connect to a network partition 171, 172. As such, the selector 254 may receive a corresponding control message from the terminal indicative of the service request (not shown in FIGS. 7 and 8).

Figure 9:
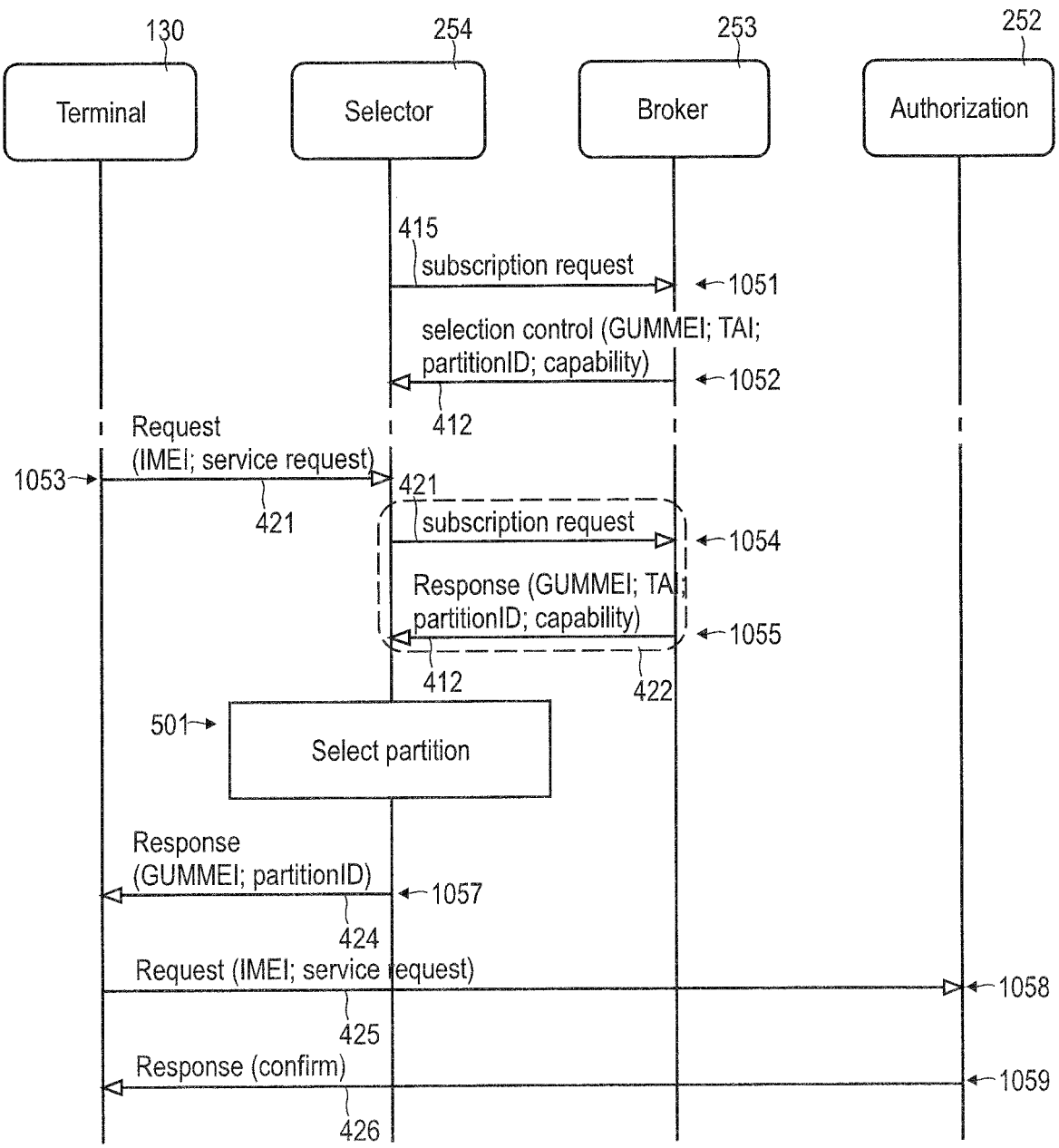
FIG. 9 is a signaling diagram illustrating network partition selection according to various embodiments.

FIG. 9 illustrates aspects with respect to network partition selection.

1051 generally corresponds to 1021. 1052 generally corresponds to 1022.

Then, at 1053, the terminal 130 sends a control message 421 which is received by the selector 254. The control message 421 corresponds to a connection request of the terminal 130 to connect to any network partition 171, 172. The control message 421 is indicative of the terminal 130. The control message indicates the International Mobile Station Equipment Identity (IMEI) in the example of FIG. 9.

Optionally the control message 421 may indicate a service request of the terminal. The service request may correlate with the service capabilities 187 of the various candidate network partitions 171, 172.

Despite subscription to the broker 253, the selector 254 does not have sufficient information to directly answer the request formulated by the control message 421. Thus, at 1054, the selector 254 forwards the control message 421 to the broker 253 in response to receiving the control message 421 at 1053. Also, in a pull scenario (not shown in FIG. 9), the selector 254 may send a control message to the broker 253 in response to receiving the control message 421 from the terminal 130. The broker 253 then sends the control message 412 to the selector 254, 1055. The control message 412 includes up-to-date information on available network partitions 171, 172. 1054 and 1055 form the optional block 422. E.g., in a push scenario, 422 may not be required.

At 501, the selector 254 performs network partition selection. Here, the selector 254 may compare the service capabilities 187 of the current operational states 181-184 to the available network partitions 171, 171 with the service request received from the terminal in the control message 421.

The selector 254 then sends a corresponding control message 424 to the terminal 130, 1057. The control message 424 indicates the identity of the selected network partition 171, 172 and further indicates an address of the authorization entity 252 which should be used to seek access to the corresponding network partition 171, 172.

The terminal, at 1058, then sends a control message 425 to the correspondingly identified authorization entity 252. The authorization entity 252, at 1059, sends a confirmation control message 426 to the terminal 130.

Figure 10:
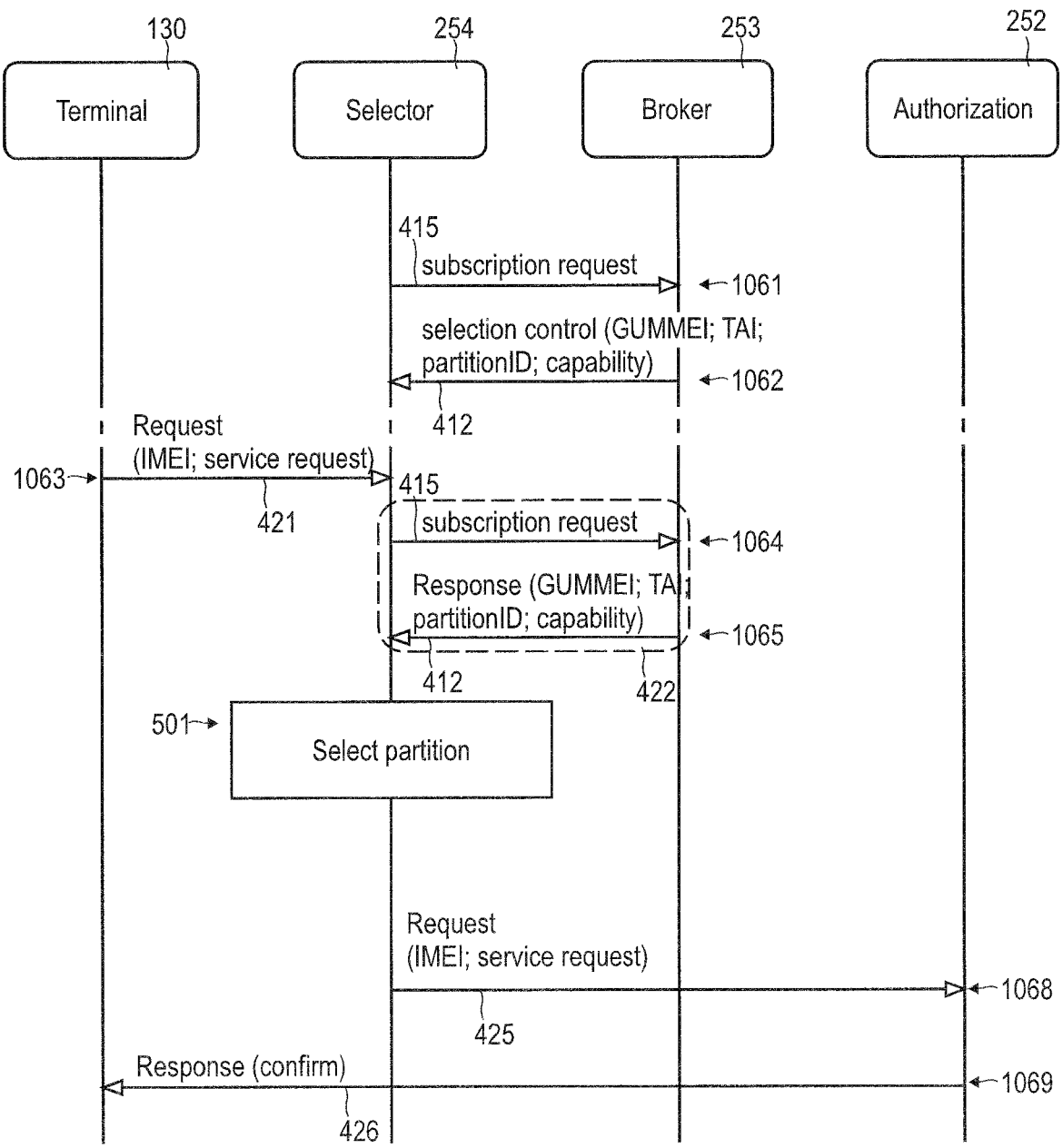
FIG. 10 is a signaling diagram illustrating network partition selection according to various embodiments.

FIG. 10 illustrates aspects with respect to network partition selection. In particular, FIG. 10 corresponds to a proxy scenario. Here, 1061-1065 generally correspond to 1051-1055. In the proxy scenario FIG. 10, the selector 254 forwards the request of the terminal 130 to the authorization entity 252 by means of the control message 425, 1068. 1069 generally corresponds to 1059.

Figure 11:
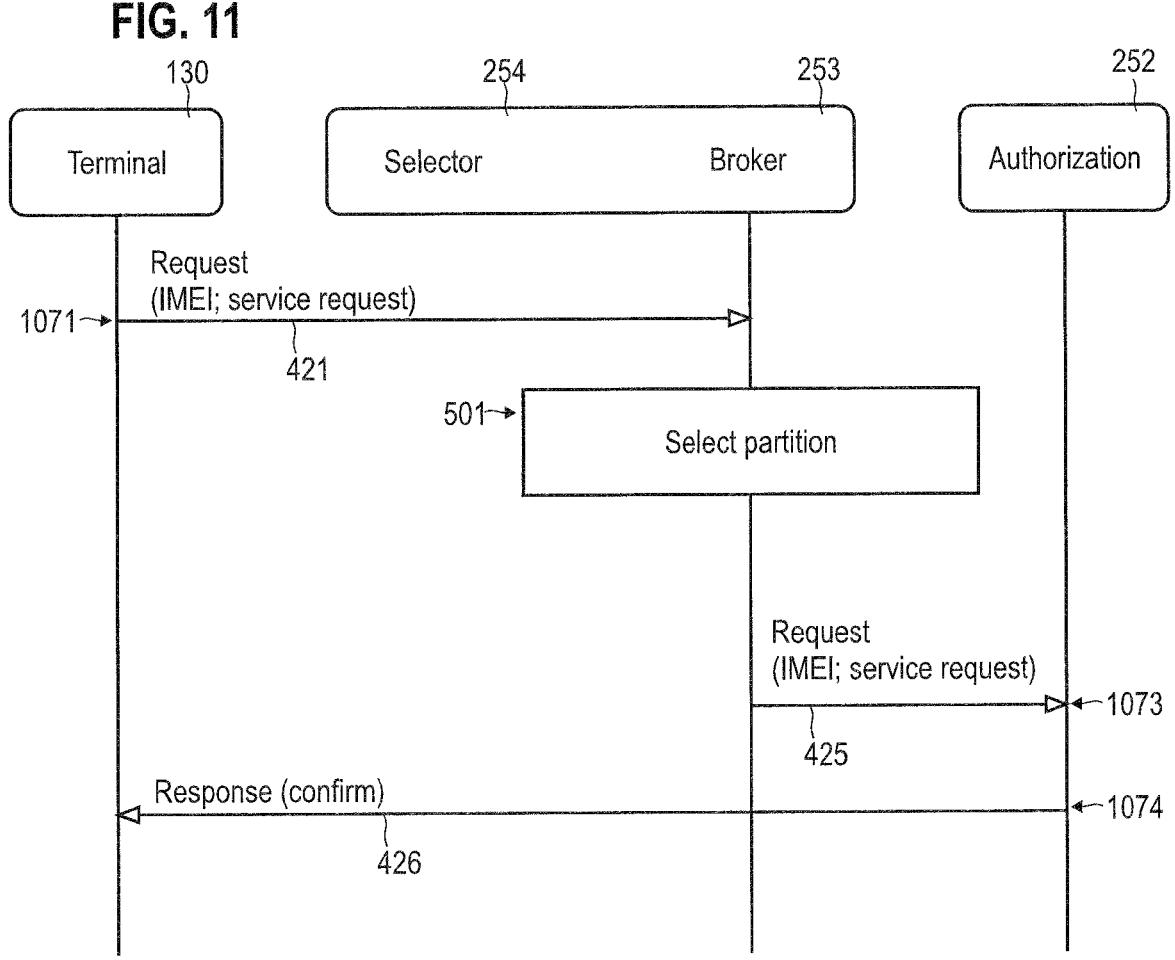
FIG. 11 is a signaling diagram illustrating network partition selection according to various embodiments.

FIG. 11 illustrates aspects with respect to network partition selection. In particular, FIG. 11 corresponds to a proxy scenario.

In the example of FIG. 11, the selector 254 and the broker 253 are co-implemented. 1071 generally corresponds to 1053. The broker 253/selector 254 then performs the network partition selection, 501. 1073, 1074 generally correspond to 1068, 1069. An advantage of co-implementing the broker 253 and the selector 254 is that communication of information on the available network partitions 171, 172 between the broker 253 and the selector 254 via core network signaling is avoided; on the other hand, the signaling load imposed on the broker 253 can be increased.

Figure 12:
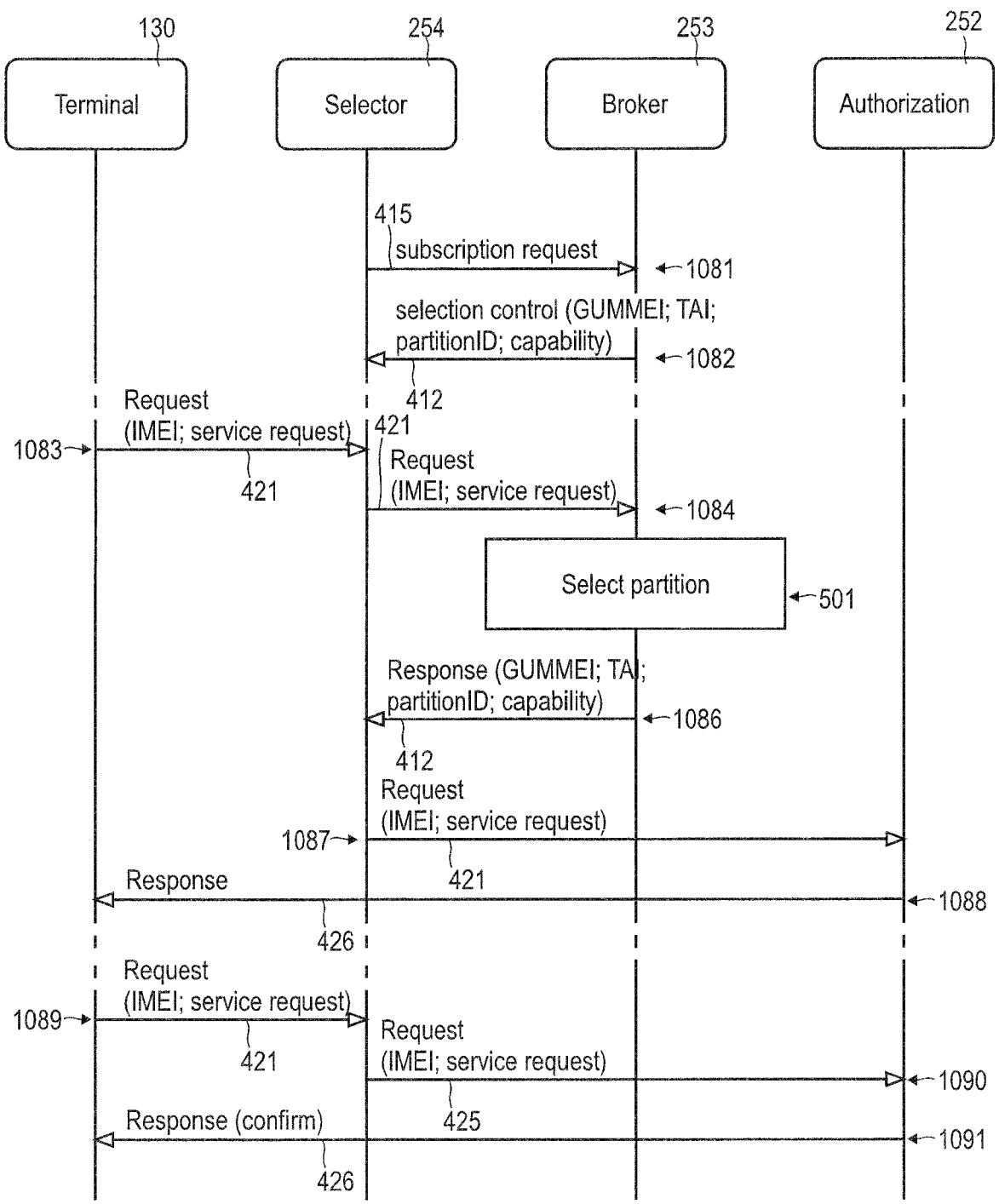
FIG. 12 is a signaling diagram illustrating network partition selection according to various embodiments.

FIG. 12 illustrates aspects with respect to network partition selection. In particular, FIG. 12 corresponds to redirect scenario. 1081, 1082 generally correspond to 1051, 1052. 1083 generally corresponds to 1053.

In the scenario of FIG. 12, in response to receiving the control message 421 implementing the connection request of the terminal 130, the selector 254 does not have sufficient information available to perform the network partition selection. Thus, in response to receiving the control message 421 at 1083, the selector 254 forwards/redirects the request message 421 to the broker 253, 1084. E.g., the selector 254 may check the duration since the last update of cached information regarding the registry 190. E.g., the selector 254 may compare the service request indicated by the control message 421 with the service capabilities 187 of the locally cached information on network partitions 171, 172. All such decision criteria may be used to decide to forward the control message 421 to the broker 253.

The broker 253 has all information on the available network partitions 171, 172 available in the registry 190. Based on the registry 190, the broker 253 performs the network partition selection, 501.

The broker 253 then sends a redirect control message 412 back to the selector 254, 1086. The selector 254 and forwards the request message 421 to the authorization entity 252 indicated in the redirect control message 412. Optionally, the selector 254 can also store the information included in the control message 412 received at 1086; thereby, upcoming request received from terminals can be locally treated at the selector 254. In such a scenario, it is not required that updated information on the registry 190 is signaled each time to the selector 254. Thus, control signaling can be reduced. Rather, information on the available network partitions 171, 172 is provided on demand. In this sense, the redirect scenario of FIG. 12 corresponds to an advanced pull scenario.

Figure 13:
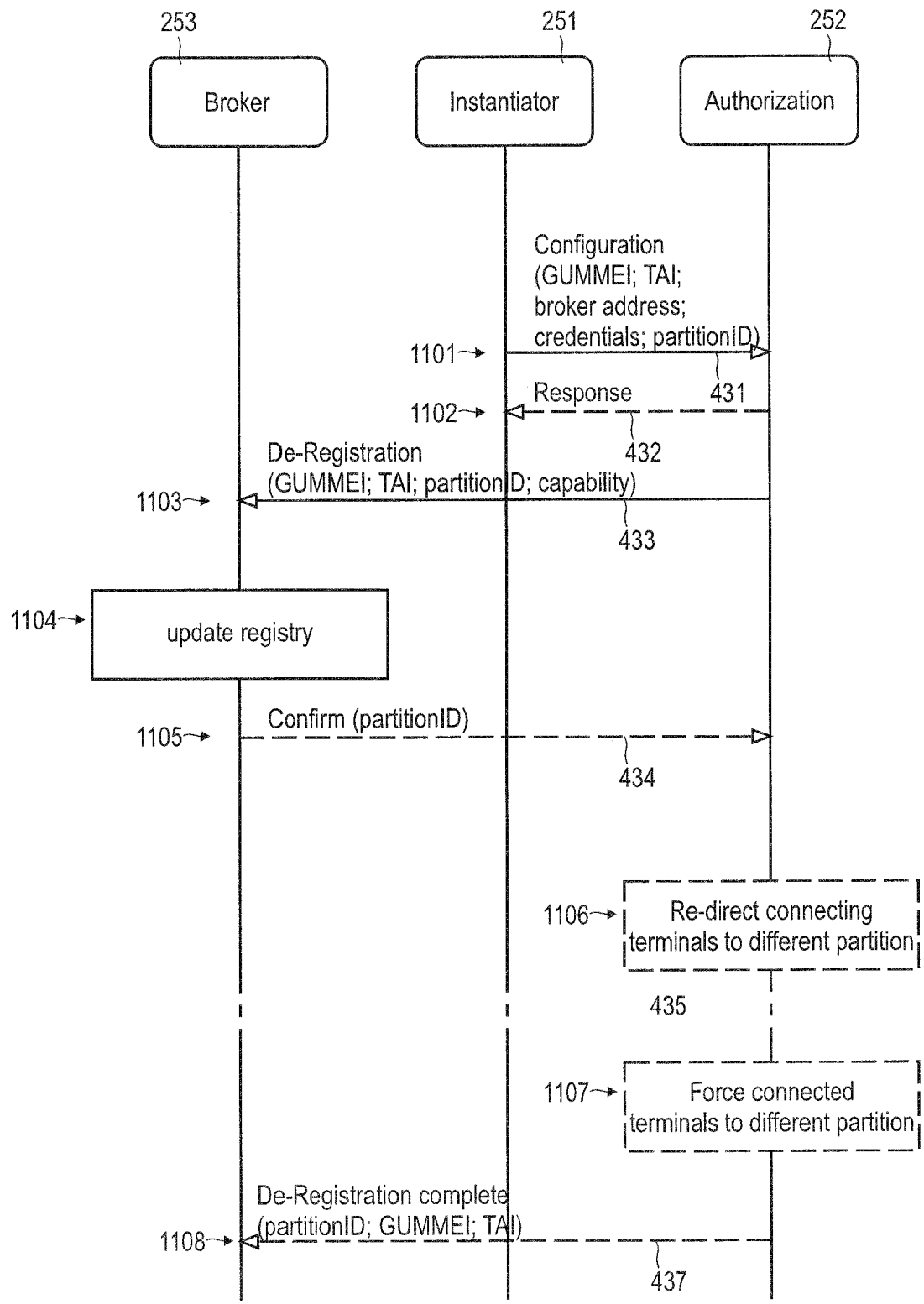

FIG. 13 is a signaling diagram illustrating aspects of updating entries 191, 192 of the registry 190. These techniques enable to address scenarios where network partitions 171, 172 transition between different operational states 181-184 in a dynamic fashion and comparably frequently. FIG. 13 relates to a scenario of a transition 189 implementing a decommission of the respective network partition 171, 172.

When decommissioning a given network partition 171, 172, according to various examples measures are taken to ensure that services provided to terminals 130, 130-1, 130-2 currently connected to the network partition 171, 172 being decommissioned are not interrupted. This may include moving existing subscribers to other network partitions 171, 172 before finally destroying the given network partition 171, 172. According to various examples, it can be checked whether all terminals 130, 130-1, 130-2 previously connected to the given network partition 171, 172 to be decommissioned have been moved to a different network partition 171, 172.

There are various scenarios conceivable that can be used in isolation or a combination for implementing decommissioning of a given network partition 171, 172.

In an example, the instantiator 251 indicates the intent to decommission a given network partition 171, 172. Then, new connections of further subscribers to the given network partition 171, 172 are prevented. Such a scenario is illustrated in FIG. 13.

At 1101, the instantiator 251 sends a configuration message 431 to the authorization entity 252. The configuration message 431 is indicative of the intended decommission of the corresponding network partition 171, 172 with which the authorization entity 252 is associated. At 1102, the authorization entity 252 sends a response control message 432 to the instantiator 251, the response control message 432 confirming decommissioning of the given network partition 171, 172.

Subsequently, the authorization entity 252 sends a control message 433 to the broker 253, 1103. The authorization entity 252, thereby, informs the broker 253 about the decommissioning. The decommissioning of the network partition 171, 172 is still pending as long as there are terminals 130, 130-1, 130-2 still attached to the network partition 171, 172.

In response to receiving the control message 433, the broker 253 updates the registry 190 accordingly, 1104. E.g., the corresponding entry 191, 192 of the registry 190 can be updated to indicate the operational state 183: this operational state is associated with not accepting new services 187, i.e., limited order to service capability 187 of the corresponding network partition 171, 172 (cf. FIG. 3A). Hence, the broker 253 disables selection of network partition 171, 172 to be decommissioned for further terminals 130, 130-1, 130-2.

Then, the broker 253 effects network partition selection. The network partition selection can inform the selectors 254 of the updated operational state 181-184 of the network partition 171, 172 to be decommissioned. In this context, network partition selection according to the various examples described herein may be employed. This includes pull, push, redirect, and/or proxy scenarios. In case of proxy redirect techniques, the broker 253 is to some small or large extent directly involved with the network partition selection and adjusts the letter correspondingly.

In one example, the broker 253 selectively informs those selectors 254 that are actually affected by the change of the operational state 181-184 of the network partition 171, 172 to be decommissioned. The broker 253 may be aware of the particular selectors 254 which have the information corresponding to the respective entry 191, 192 of the network partition 171, 172 to be decommissioned locally cached.

In response to updating the registry 190 at 1000 and 104, the broker 253 optionally provides a confirmation control message 434 to the authorization entity 252, 1105.

As outlined above, there are various scenarios conceivable where the selector 254 may cache information on the entries 191, 192 locally; hence, the information on the updated operational state 181-184 of the network partition 171, 172 to be decommissioned may not arrive at the selector 254 for a certain period of time. An example is the pull method or the push method with a comparably relaxed timing schedule 419.

In such a scenario, it is conceivable that at the terminal 130, 130-1, 130-2 attempts connection to the network partition 171, 172 to be decommissioned, because network partition selection performed by the selector 254 indicated the corresponding network partition 171, 172 is based on outdated cached information. Here, the authorization entity 252 can provide an error control message rejecting the attempt to connect to the network partition 171, 172 to be decommissioned; subsequently, the selector 254 can remove the obsolete cached entry. In addition or alternative to the error control message, the authorization entity 252 can redirect connecting terminals 130, 130-1, 130-2 to different network partitions 171, 172, 1106. Hence, when the network partition 171, 172 is to be decommissioned, the authorization entity 252 can redirect the setup of the signaling connection to another authorization entity. Such a redirection could be implemented in various ways: e.g., the authorization entity 252 could redirect the signaling to another authorization entity. This could be done, e.g., using redirection mechanisms defined in DECOR which redirect signaling messages via the radio access network. In a further example, the authorization entity 252 could alternatively or additionally sent a control message back to the terminal 130, 130-1, 130-2 to reject the setup of the signaling connection. The authorization entity 252 may advise for a new network partition—which advice could be based on a configuration message previously received from the instantiator 252—, and/or the terminal 130, 130-1, 130-2 could reconnect without a specific identity of a network partition 171, 172 and allow the selector 254 to perform the network partition selection as described above.

Eventually, the authorization entity 252, at 1107, forces connected terminals 130, 130-1, 130-2 to different network partitions 171, 172. In one example, as soon as a subscriber does not have an active connection with the network 100, it is possible to trigger such a migration of the corresponding terminal to a different network partition 171, 172. In one example, such a re-selection of the network partition 171, 172 can be triggered during the transition from idle state to connected state of a given terminal 130, 130-1, 130-2. In detail, during such a transition from idle state to connected state, the terminal 130, 130-1, 130-2 sets of the signaling connection to the authorization entity 252 via the radio access network.

Generally, forcefully moving terminals 130, 130-1, 130-2 to different network partitions 171, 172 may lead to service disruption. Hence, other techniques may be preferably employed if compared to such a forceful reconnection of the terminals 130, 130-1, 130-2. E.g., in a 3GPP-based technology, such reconnection can be implemented by triggering a re-attach procedure: this may be done by performing an explicit Detach with reattach required. Alternatively or additionally, it is possible to release terminal 130, 130-1, 130-2 to either mode and force it to perform a new Registration/Tracking Area Update using the release cause code "load balancing Tracking Area Update required". In other systems, corresponding mechanisms can be applied.

Once a given network partition 171, 172 has been depopulated, the authorization entity 252 can send a corresponding control message 437 to the broker 253, 1108. The control message 437 can inform the broker 253 of the successful depopulation of the corresponding network partition 171, 172. Then, the broker 253 may update the registry 190 accordingly, e.g., set the corresponding entry 191, 192 to be indicative of the operational state 184.

After that, the network partition 171, 172 is considered deleted and the resources can be released. The broker 253 may send additional messages to the selectors 254 to inform that the deletion has been completed.

In one example, the control message 431 and/or the control message 433 includes additional information. This information may indicate a time duration during which the operational state 183 preparing the complete the commission of the corresponding network partition 171, 172 should be active. In other words, this information may indicate the time duration during which the broker 253 maintains a corresponding entry 191, 192 indicative of the operational state 183 in the registry 190; this information may also be indicative of the time duration during which the authorization entity 252 has to perform the redirection at 1106. E.g., in a scenario where the decommission of the given network partition 171, 172 is comparably urgent—e.g., due to resource limitations—, it would also be possible to directly transition into the operational state 184, i.e., to skip the intermediate shutdown operational state 183. Then, 1107 may be immediately executed, thereby, forcefully moving all connected terminals 130-1, 130-2 to different network partitions 171, 172.

In one example, the authorization entity 252 can provide information on the count of terminals 130, 130-1, 130-2 connected to the respective network partition 171, 172 to be decommissioned to the instantiator 251 and/or the broker 253. E.g., such information may be provided as part of the control message 432 to the instantiator 251 and/or as part of the control message 433 to the broker 253. Also, such information may be provided as part of an additional control message (not shown in FIG. 13).

Figure 14:
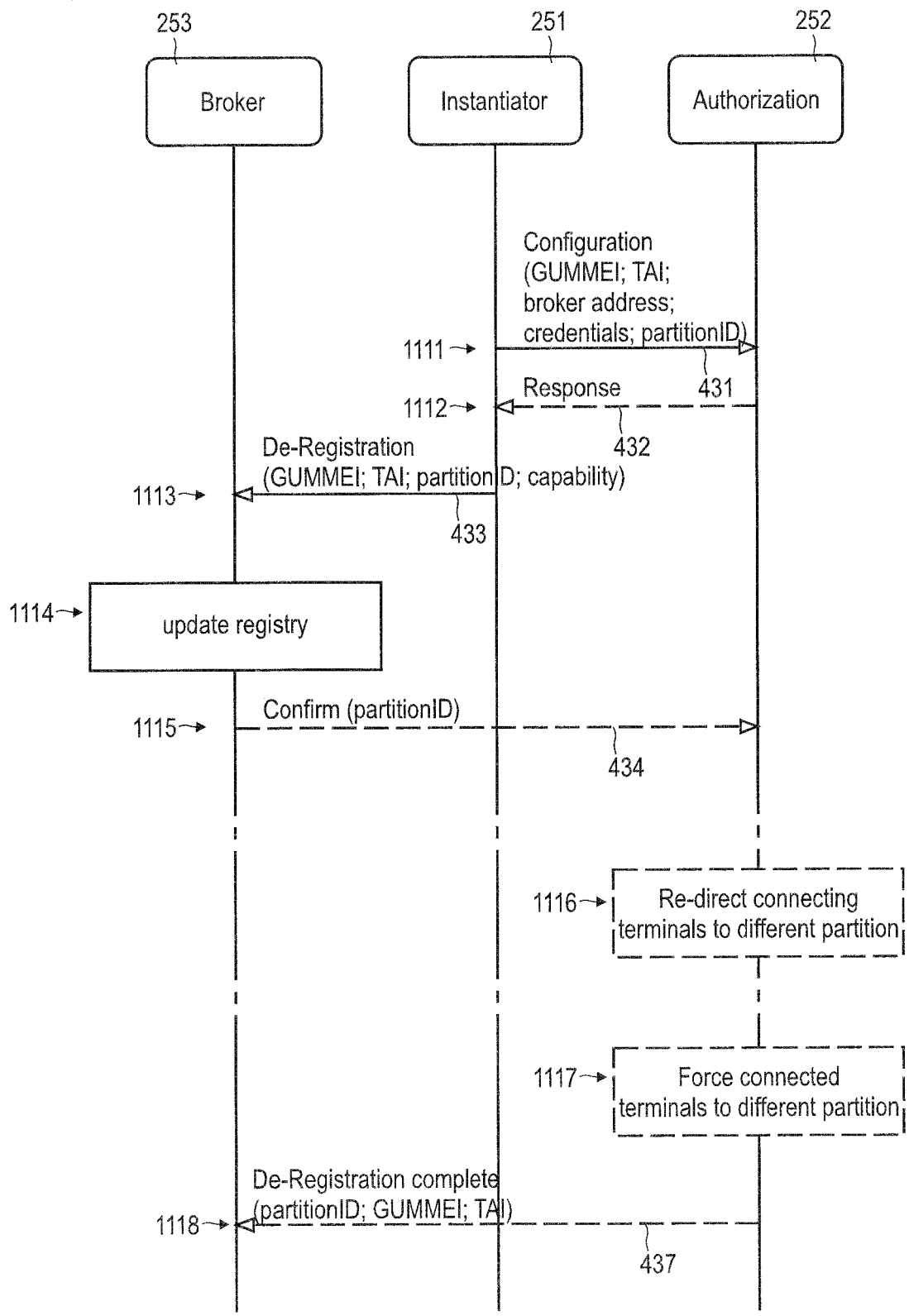

FIG. 14 is a signaling diagram illustrating aspects of updating entries 191, 192 of the registry 190. These techniques enable to address scenarios where network partitions 171, 172 transition between different operational states 181-184 in a dynamic fashion and comparably frequently. FIG. 14 relates to a scenario of a transition 189 corresponding to a decommission of the respective network partition 171, 172.

FIG. 14 generally corresponds to FIG. 13. In particular, 1111 and 1112 correspond to 1101 and 1102, respectively. In the example of FIG. 14, the control message 433 informing the broker 253 about the decommissioning of the corresponding network partition 171, 172 is sent by the instantiator 251 to the broker 253, 1113. 1114-1118 correspond to 1104-1108, respectively.

Figure 15:
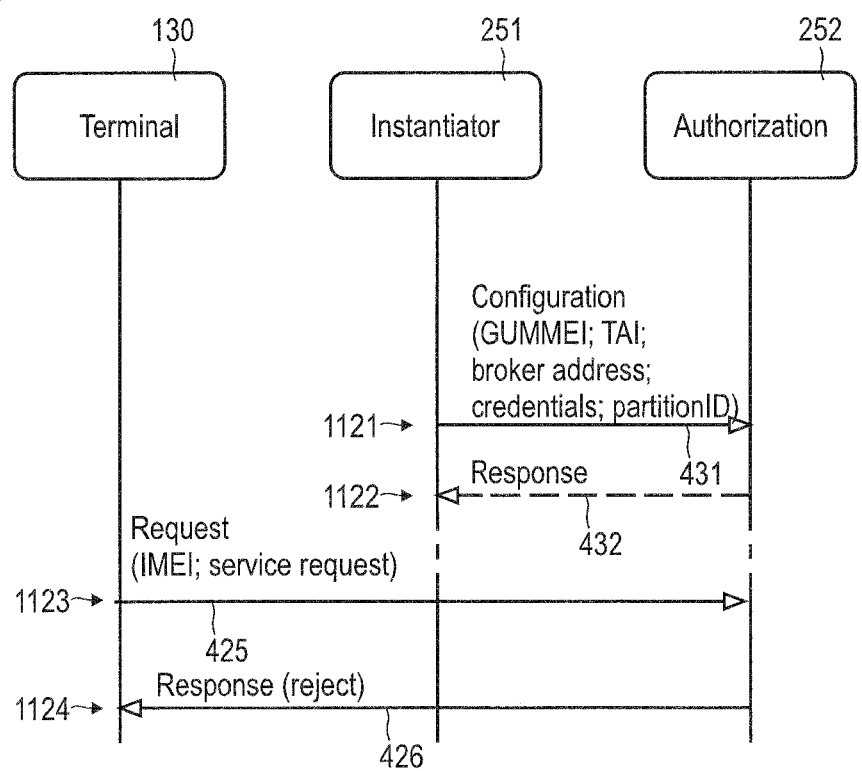

FIG. 15 is a signaling diagram illustrating aspects of updating entries 191, 192 of the registry 190. FIG. 15 relates to the scenario of a transition 189 corresponding to a decommission of a respective network partition 171, 172. In the scenario of FIGS. 15, 1121 and 1122 generally correspond to 1101, 1102, respectively.

Then, at 1123, a terminal 130 sends a request control message to the authorization entity 252 associated with the network partition 171, 172 to be decommissioned. In one example, the terminal 130 sends the request control message 425 based on a network partition selection 501 performed by the selector 254 (not shown in FIG. 15). E.g., that network partition selection 501 may be based on outdated information, e.g., because a push model for distributing information on the updated registry 190 has been employed.

The authorization entity 252 then sends a reject control message 426 to the terminal 130, 1124. Thereby, the authorization entity 252 makes sure that no new services are offered by the network partition 171, 172 to be decommissioned. New connections are not authorized.

Figure 16:
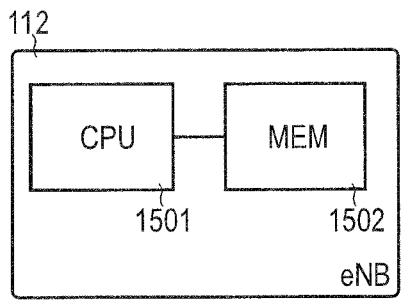
FIG. 16 schematically illustrates a BS according to various embodiments

FIG. 16 schematically illustrates the eNB 112. The eNB 112 comprises a processor 1501 and a non-volatile memory 1502. The memory 1502 stores control instructions that can be executed by the processor 1501. Executing the control instructions causes the processor 1501 performing various techniques described herein, such as: executing network partition selection; and/or communicating with the broker 253; etc. The eNB 112 may implement the selector 254.

Figure 17:
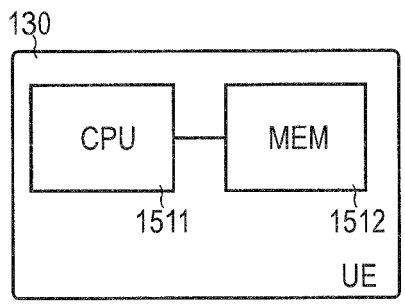
FIG. 17 schematically illustrates a terminal according to various embodiments

FIG. 17 schematically illustrates the terminal 130. The terminal 130 comprises a processor 1511 and a non-volatile memory 1512. The memory 1512 stores control instructions that can be executed by the processor 1511. Executing the control instructions causes the processor 1511 to perform various techniques described herein, such as: sending a connection request to the selector 254; and/or connecting to a network partition 171, 172; etc. E.g. the terminal may be selected from the group comprising: a smartphone; an Internet of Things (IoT) device; a laptop; a tablet computer; etc.

Figure 18:
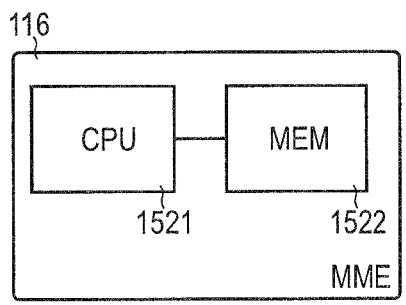
FIG. 18 schematically illustrates a MME according to various embodiments

FIG. 18 schematically illustrates the MME 116. The MME 116 comprises a processor 1521 and a non-volatile memory 1522. The memory 1522 stores control instructions that can be executed by the processor 1521. Executing the control instructions causes the processor 1521 to perform various techniques described herein, such as: maintaining and/or updating the registry 190; participating in the communication of a control message for effecting network partition selection; participating in a control message for effecting update of the registry; etc. The MME 116 may implement the selector 254 and/or the broker 253 and/or the authorization entity 252.

Figure 19:
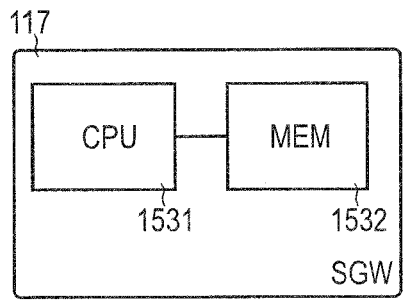
FIG. 19 schematically illustrates a SGW according to various embodiments.

FIG. 19 schematically illustrates the SGW 117. The SGW 117 comprises a processor 1531 and a non-volatile memory 1532. The memory 1532 stores control instructions that can be executed by the processor 1531. Executing the control instructions causes the processor 1531 to perform various techniques described herein, such as: maintaining and/or updating the registry 190; participating in the communication of a control message for effecting network partition selection; participating in a control message for effecting update of the registry; etc.

The SGW 117 may implement the selector 254 and/or the broker 253 and/or the authorization entity 252.

Figure 20:
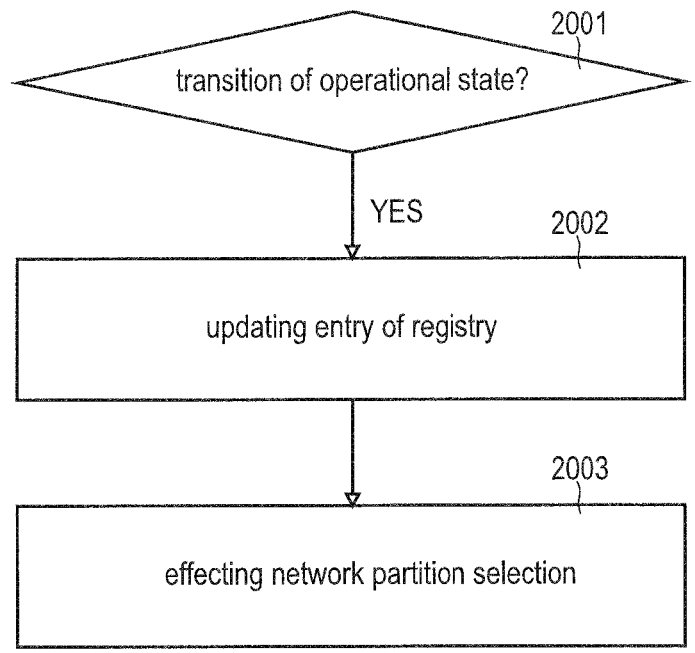
FIG. 20 is a flowchart of a method according to various embodiments.

FIG. 20 is a flowchart of a method according to various embodiments. E.g., the method of FIG. 20 may be executed by the broker 253. E.g., the broker 253 may be implemented by the MME 116 or another entity.

At 2001, it is checked whether a transition 189 between two operational states 181-184 has occurred for a given network partition 171, 172. 2001 may involve the reception of a registration control message indicative of at least one of the following elements: the at least one authorization entity associated with a given network partition 171, 172; an address of the respective authorization entity; a tracking area of the respective authorization entity; an identity of the respective network partitions 171, 172; the service capability 187 of the given network partition 171, 172; and the current operational state 181-184 of the given network partition 171, 172.

If at 2001 the transition 189 is detected, the method commences at 2002. At 2002, the respective entry 191, 192 of the registry 190 is updated. In particular, the new operational state 181-184 can be indicated in the updated entry 191, 192. The operational state may be explicitly or implicitly indicated, e.g., by means of the associated service capabilities 187.

Then, at 2003, the network partition selection 501 is effected. Effecting the network partition selection at 2003 may involve communicating a selection control message. The selection control message may inform the selector 254 on the changes to the registry 190. In some examples, effecting the network partition selection at 2003 may involve executing the network partition selection. Such a scenario may be applicable where the selector 254 is co-implemented with the broker 253.

Figure 21:
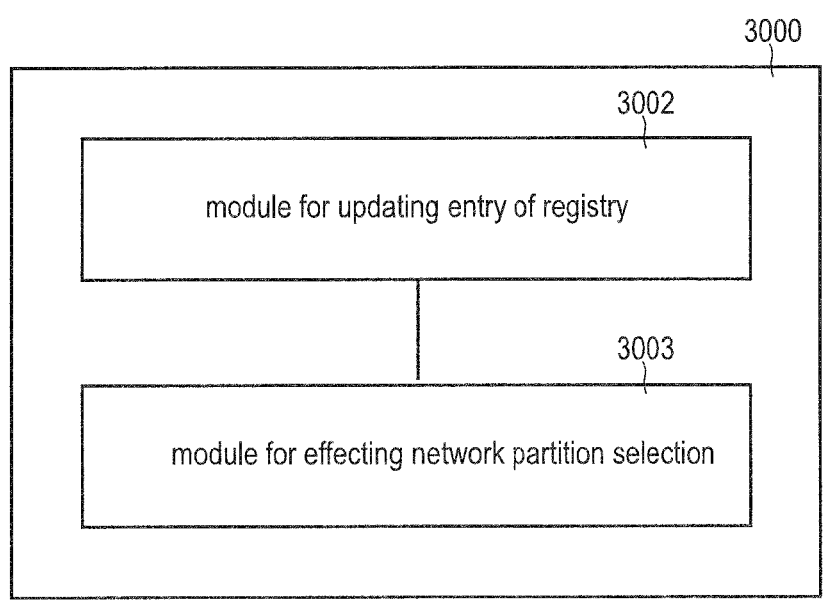
FIG. 21 schematically illustrates an entity according to various embodiments.

FIG. 21 illustrates an entity 3000 that is suited to execute a method according to FIG. 20. For this, the entity 3000 comprises a module for updating the entry of the registry 3002 and a module for effecting the network partition selection 3003.

Figure 22:
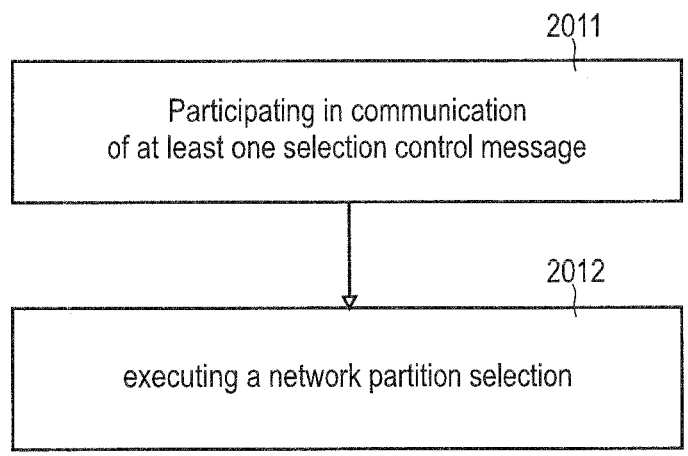
FIG. 22 is a flowchart of a method according to various embodiments.

FIG. 22 is a flowchart of a method according to various embodiments. E.g., the method of FIG. 22 may be executed by the selector 254. E.g., the selector 254 may be implemented by the MME 116, the eNB 112, or another entity.

At 2011, participation in communication of the selection control message may take place. The selection control message may be indicative of an entry 191, 192 of the registry 190—e.g., of a recently updated entry 191, 192. As such, the selection control message may indicate an identity of the respective network partition 171, 172, parameters with respect to the corresponding authorization entity 252, etc.

The selection control message may be communicated in response to an event of a predefined repetitive push timing schedule, the updating of a respective entry 191, 192 of the registry 190, reception of a subscription request message by the broker 423, and/or reception of a request message triggering push communication of the selection control message.

Then, 2012, the network partition selection 501 is executed. For this, service capabilities of the current operational states 181-184 of a plurality of network partitions 171, 172—e.g., as known from the reception of one or selection control messages—may be compared against a service request received from a terminal 130, 130-1, 130-2.

Figure 23:
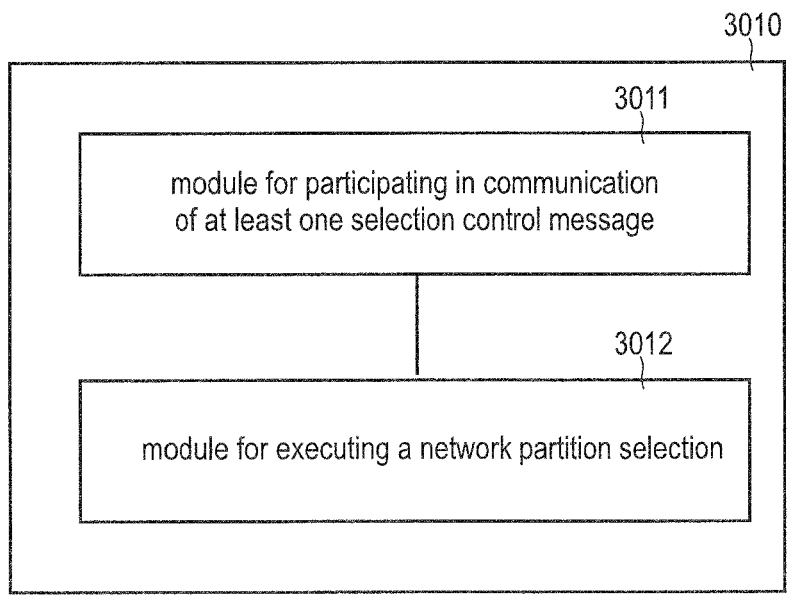
FIG. 23 schematically illustrates an entity according to various embodiments.

FIG. 23 illustrates an entity 3010 that is suited to execute a method according to FIG. 21. For this, the entity 3010 comprises a module for participating in communication of at least one selection control message 3011, as well as a module for executing the network partition selection 3012.

Figure 24:
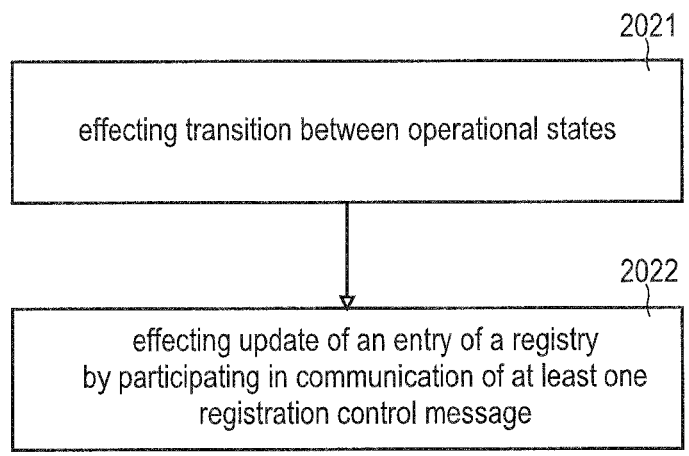
FIG. 24 is a flowchart of a method according to various embodiments.

FIG. 24 is a flowchart of a method according to various embodiments. E.g., the method of FIG. 24 may be executed by the instantiator 251.

At 2021, transition 189 between two operational states 181-184 is effected for a given network partition 171, 172. This may involve communication of one or more control messages between the instantiator 251 and the authorization entity 252.

At 2022, the update of an respective entry 191, 192 of the registry 190 is effected. This might be implemented by triggering or participating in communication of at least one registration control message. The registration control message may be indicative a certain information with respect to the respective network partition 171, 172, the current operational state 181-184 of the respective network partition 171, 172, the service capability 187 associated with the current operational state 181-184, the authorization entity 251 associated with the respective network partition 171, 172, etc.

Figure 25:
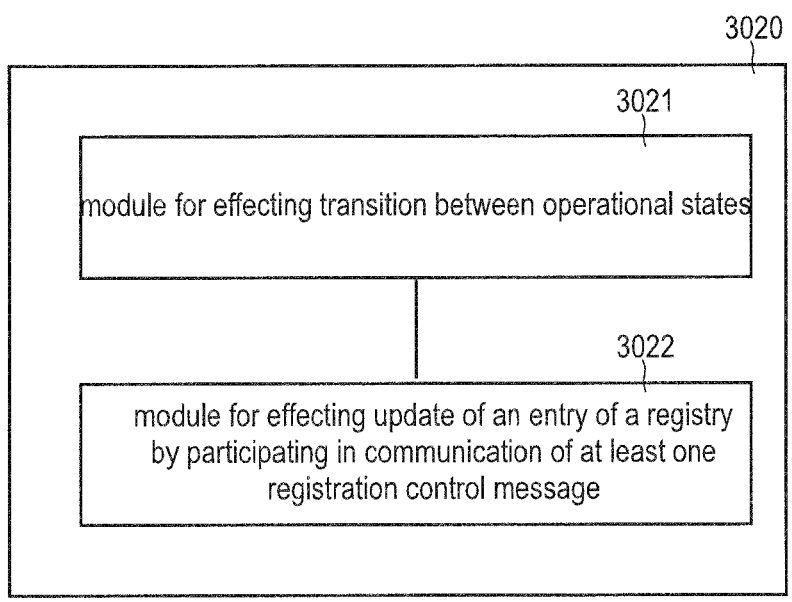
FIG. 25 schematically illustrates an entity according to various embodiments.

FIG. 25 illustrates an entity 3020 that is suited to execute the method according to FIG. 24. For this, the entity 3020 comprises a module for effecting the transition between operational states 3021 and further comprises a module for effecting an update of an entry of a registry by participating in communication of at least one registration control message 3022.

Summarizing, above, various techniques with respect to updating a registry of a plurality of network partitions—sometimes also referred to as network slices—of a core of a cellular network have been disclosed. Furthermore, various techniques with respect to network partition selection for a terminal based on entries of the registry have been disclosed.

In some examples, instead of pulling the respective information on authorization entities at a comparably low periodicity—or, in terms of bandwidth, even worse at a high periodicity—, a selective and dynamic mechanism allowing a selector for executing the network partition selection to obtain up-to-date information on authorization entities associated with the network partitions is disclosed.

In some examples, the registry is maintained at the broker. The registry enables to have an up-to-date list of available network partitions and associated authorization entities. The broker is configured to advertise information associated with the registry to the selector for executing the network partition selection. Such advertising may be implemented in a selective manner, e.g., depending on a service request previously received from the selectors.

The techniques disclosed herein enable for dynamic concepts of network partitioning where network partitions are expected to be created on demand and/or be short-lived.

In one example, push communication from the broker to the selectors implemented. This can be done via DNS Push or MQTT or Diameter in some examples. Other protocols are conceivable.

In some examples, techniques with respect to the decommission of a network partition are explained. Service interruptions are avoided by updating the registry accordingly.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

While above various techniques have been described with respect to the registry of the plurality of network partitions, corresponding techniques may also be applied for a registry of other components. As cellular networks are likely to become more self-configuring in the future, similar mechanism could be used for registering other components, such as gateways in the user plane—e.g., PGWs or SGWs—of the core of the cellular network.

While above various examples have been described where the authorization entity is embodied as an MME, in other examples the authorization entity may be embodied by other devices.

While above various examples have been described with respect to an implementation of the cellular network according to 3GPP LTE, in other examples other kinds and types of networks may benefit from the techniques described herein.

The invention claimed is:

1. A method, comprising:
in response to a transition from a previous operational state to a current operational state of a given network partition of a plurality of network partitions of a core of a cellular network: updating a respective entry of a registry of the plurality of network partitions;
effecting a network partition selection for a terminal by transmitting at least one selection control message corresponding to at least one entry of the registry; and
each entry of the registry associating a respective network partition of the plurality of network partitions with at least one authorization entity for granting access to the respective network partition.

2. The method of claim 1, wherein each entry of the registry associates a respective network partition of the plurality of network partitions further with a service capability of the current operational state of the respective network partition.

3. The method of claim 1, wherein the transmitting in the communication of the at least one selection control message is in response to at least one of the following:
an event of a predefined repetitive push timing schedule;
the updating of the respective entry;
reception of a subscription request message triggering transmitting the at least one selection control message via a push communication;
reception of a request message triggering transmitting the at least one selection control message via a pull command; and
comparison of a service request with a service capability of the current operational state of the respective network partition.

4. The method of claim 1, wherein the entries of the registry further associate load balancing priorities with the authorization entities associated with the plurality of network partitions.

5. The method of claim 1, further comprising:
receiving at least one registration control message, said updating of the respective entry being based on the registration control message; and
wherein the at least one registration control message is indicative of elements selected from the group comprising:
the at least one authorization entity associated with the given network partition;
an address of the at least one authorization entity associated with the given network partition;
a tracking area of the at least authorization entity associated with the given network partition;
an identity of the given network partition;
the service capability of the given network partition; and
the current operational state (181-184) of the given network partition.

6. The method of claim 1, wherein the transition is a commission or a decommission of the given network partition.

7. A device, comprising:
a memory configured to store control instructions; and
at least one processor coupled with the memory and configured to execute the control instructions, execution of the control instructions causing the at least one processor to perform:
in response to a transition from a previous operational state to a current operational state of a given network partition of a plurality of network partitions of a core of a cellular network, updating a respective entry of a registry of the plurality of network partitions;
effecting a network partition selection for a terminal by participating in a communication of at least one selection control message corresponding to at least one entry of the registry; and
each entry of the registry associating a respective network partition of the plurality of network partitions with at least one authorization entity for granting access to the respective network partition.

8. A method, comprising:
receiving at least one selection control message corresponding to a plurality of entries of a registry of a plurality of network partitions of a core of a cellular network, the at least one selection control message being indicative of authorization entities for granting access to the plurality of network partitions; and
based on the at least one selection control message, executing a network partition selection of a given network partition of the plurality of network partitions for a terminal.

9. The method of claim 8, wherein the at least one selection control message is further indicative of a service capability of a current operation state of the given network partition.

10. The method of claim 9, further comprising:
receiving a connection request of the terminal, the connection request being indicative of a service request of the terminal;

comparing the service capabilities of the current operational states of the plurality of network partitions with the service request of the terminal; and
based on the comparing, executing the network partition selection for the terminal.

11. The method of claim 8, further comprising:
based on the at least one selection control message, maintaining a cached copy of the registry of the plurality of network partitions.

12. A device, comprising:
a memory configured to store control instructions; and
at least one processor coupled with the memory and configured to execute the control instructions, execution of the control instructions causing the at least one processor to perform:
receiving at least one selection control message corresponding to a plurality of entries of a registry of a plurality of network partitions of a core of a cellular network, the at least one selection control message being indicative of authorization entities for granting access to the plurality of network partitions; and
based on the at least one selection control message:
executing a network partition selection of a given network partition of the plurality of network partitions for a terminal.

13. The device of claim 12, wherein the at least one selection control message being is indicative of a service capability of a current operation state of the given network partition.

14. The device of claim 12, wherein the processor is further configured to:
receive a connection request of the terminal, the connection request being indicative of a service request of the terminal;
compare the service capabilities of the current operational states of the plurality of network partitions with the service request of the terminal; and
based on the comparing, execute the network partition selection for the terminal.

15. The device of claim 12, wherein the processor is further configured to, based on the at least one selection control message, maintain a cached copy of the registry of the plurality of network partitions.

16. A method, comprising:
effecting a transition from a previous operational state to a current operational state of a given network partition of a plurality of network partitions of a core of a cellular network; and
effecting updating of a respective entry of a registry of the plurality of network partitions by transmitting at least one registration control message, the at least one registration control message being indicative of at least one authorization entity for granting access to the given network partition and further indicative of a service capability of the current operational state of the given network partition.

17. The method of claim 16, wherein the at least one registration control message is further indicative of elements selected from the group comprising:
an address of the at least one authorization entity associated with the given network partition;
a tracking area of the at least authorization entity associated with the given network partition;
an identity of the given network partition;
the service capability of the given network partition; and
the current operational state of the given network partition.

18. A device, comprising:
a memory configured to store control instructions; and
at least one processor coupled with the memory and configured to execute the control instructions, execution of the control instructions causing the at least one processor to perform:
effecting a transition from a previous operational state to a current operational state of a given network partition of a plurality of network partitions of a core of a cellular network; and
effecting updating of a respective entry of a registry of the plurality of network partitions by transmitting at least one registration control message, the at least one registration control message being indicative of at least one authorization entity for granting access to the given network partition further indicative of a service capability of the current operational state of the given network partition.

* * * * *